(12) United States Patent
Kiser et al.

(10) Patent No.: US 10,554,901 B2
(45) Date of Patent: Feb. 4, 2020

(54) REAL-TIME HDR VIDEO FOR VEHICLE CONTROL

(71) Applicant: Contrast, Inc., Albuquerque, NM (US)

(72) Inventors: Willie C. Kiser, Albuquerque, NM (US); Nora Tocci, Albuquerque, NM (US); Michael D. Tocci, Albuquerque, NM (US)

(73) Assignee: Contrast Inc., Albuquerque, NM (US)

( * ) Notice: Subject to any disclaimer, the term of this patent is extended or adjusted under 35 U.S.C. 154(b) by 94 days.

(21) Appl. No.: 15/670,229

(22) Filed: Aug. 7, 2017

(65) Prior Publication Data

US 2018/0048801 A1 Feb. 15, 2018

Related U.S. Application Data

(60) Provisional application No. 62/372,527, filed on Aug. 9, 2016.

(51) Int. Cl.
*H04N 5/235* (2006.01)
*H04N 5/225* (2006.01)
(Continued)

(52) U.S. Cl.
CPC ............ *H04N 5/2355* (2013.01); *B60R 1/00* (2013.01); *G02B 27/106* (2013.01); *G06K 9/00805* (2013.01); *G06K 9/00818* (2013.01); *H04N 5/2258* (2013.01); *H04N 5/23238* (2013.01); *H04N 9/07* (2013.01); *H04N 9/735* (2013.01); *B60R 2300/102* (2013.01);
(Continued)

(58) Field of Classification Search
None
See application file for complete search history.

(56) References Cited

U.S. PATENT DOCUMENTS 2,560,351 A 7/1951 Kell
2,642,487 A 6/1953 Schroeder
(Continued)

FOREIGN PATENT DOCUMENTS

CN 101344706 B 9/2010
EP 0484802 A2 5/1992
(Continued)

OTHER PUBLICATIONS

Abstract of JP 2000019407 A (2 pages).
(Continued)

*Primary Examiner* — Mohammad J Rahman
(74) *Attorney, Agent, or Firm* — Brown Rudnick LLP; Thomas C. Meyers

(57) ABSTRACT

The invention provides an autonomous vehicle with a video camera that merges images taken a different light levels by replacing saturated parts of an image with corresponding parts of a lower-light image to stream a video with a dynamic range that extends to include very low-light and very intensely lit parts of a scene. The high dynamic range (HDR) camera streams the HDR video to a HDR system in real time—as the vehicle operates. As pixel values are provided by the camera's image sensors, those values are streamed directly through a pipeline processing operation and on to the HDR system without any requirement to wait and collect entire images, or frames, before using the video information.

10 Claims, 17 Drawing Sheets

(51) Int. Cl.
  *B60R 1/00* (2006.01)
  *H04N 9/73* (2006.01)
  *H04N 9/07* (2006.01)
  *G02B 27/10* (2006.01)
  *H04N 5/232* (2006.01)
  *G06K 9/00* (2006.01)
  *G05D 1/02* (2006.01)
  *G06T 1/20* (2006.01)

(52) U.S. Cl.
  CPC ........ *B60R 2300/30* (2013.01); *G05D 1/0246* (2013.01); *G06T 1/20* (2013.01)

(56) References Cited

U.S. PATENT DOCUMENTS

| | | |
|---|---|---|
| 2,971,051 A | 2/1961 | Back |
| 3,202,039 A | 8/1965 | DeLang |
| 3,381,084 A | 4/1968 | Wheeler |
| 3,474,451 A | 10/1969 | Abel |
| 3,601,480 A | 8/1971 | Randall |
| 3,653,748 A | 4/1972 | Athey |
| 3,659,918 A | 5/1972 | Tan |
| 3,668,304 A | 6/1972 | Ellenberger |
| 3,720,146 A | 3/1973 | Yost, Jr. |
| 3,802,763 A | 4/1974 | Cook et al. |
| 3,945,034 A | 3/1976 | Suzuki |
| 4,009,941 A | 3/1977 | Verdijk et al. |
| 4,072,405 A | 2/1978 | Ozeki |
| 4,084,180 A | 4/1978 | Stoffels et al. |
| 4,134,683 A | 1/1979 | Goetz et al. |
| 4,268,119 A | 5/1981 | Hartmann |
| 4,395,234 A | 7/1983 | Shenker |
| 4,396,188 A | 8/1983 | Dreissigacker et al. |
| 4,486,069 A | 12/1984 | Neil et al. |
| 4,555,163 A | 11/1985 | Wagner |
| 4,584,606 A | 4/1986 | Nagasaki |
| 4,743,011 A | 5/1988 | Coffey |
| 4,786,813 A | 11/1988 | Svanberg et al. |
| 4,805,037 A | 2/1989 | Noble et al. |
| 4,916,529 A | 4/1990 | Yamamoto et al. |
| 4,933,751 A | 6/1990 | Shinonaga et al. |
| 5,024,530 A | 6/1991 | Mende |
| 5,092,581 A | 3/1992 | Koz |
| 5,093,563 A | 3/1992 | Small et al. |
| 5,134,468 A | 7/1992 | Ohmuro |
| 5,153,621 A | 10/1992 | Vogeley |
| 5,155,623 A | 10/1992 | Miller et al. |
| 5,194,959 A | 3/1993 | Kaneko et al. |
| 5,272,518 A | 12/1993 | Vincent |
| 5,386,316 A | 1/1995 | Cook |
| 5,642,191 A | 6/1997 | Mende |
| 5,707,322 A | 1/1998 | Dreissigacker et al. |
| 5,729,011 A | 3/1998 | Sekiguchi |
| 5,734,507 A | 3/1998 | Harvey |
| 5,801,773 A | 9/1998 | Ikeda |
| 5,835,278 A | 11/1998 | Rubin et al. |
| 5,856,466 A | 1/1999 | Cook et al. |
| 5,900,942 A | 5/1999 | Spiering |
| 5,905,490 A | 5/1999 | Shu et al. |
| 5,926,283 A | 7/1999 | Hopkins |
| 5,929,908 A | 7/1999 | Takahashi et al. |
| 6,011,876 A | 1/2000 | Kishner |
| 6,215,597 B1 | 4/2001 | Duncan et al. |
| 6,646,716 B1 | 11/2003 | Ramanujan et al. |
| 6,747,694 B1 | 6/2004 | Nishikawa et al. |
| 6,801,719 B1 | 10/2004 | Szajewski et al. |
| 6,856,466 B2 | 2/2005 | Tocci |
| 7,068,890 B2 | 6/2006 | Soskind et al. |
| 7,084,905 B1 | 8/2006 | Nayar et al. |
| 7,138,619 B1 | 11/2006 | Ferrante et al. |
| 7,177,085 B2 | 2/2007 | Tocci et al. |
| 7,283,307 B2 | 10/2007 | Couture et al. |
| 7,397,509 B2 | 7/2008 | Krymski |
| 7,405,882 B2 | 7/2008 | Uchiyama et al. |
| 7,714,998 B2 | 5/2010 | Furman et al. |
| 7,719,674 B2 | 5/2010 | Furman et al. |
| 7,731,637 B2 | 6/2010 | D'Eredita |
| 7,961,398 B2 | 6/2011 | Tocci |
| 8,035,711 B2 | 10/2011 | Liu et al. |
| 8,320,047 B2 | 11/2012 | Tocci |
| 8,340,442 B1 | 12/2012 | Rasche |
| 8,441,732 B2 | 5/2013 | Tocci |
| 8,619,368 B2 | 12/2013 | Tocci |
| 8,622,876 B2 | 1/2014 | Kelliher |
| 8,659,683 B1 | 2/2014 | Linzer |
| 9,129,445 B2 | 9/2015 | Mai et al. |
| 9,131,150 B1 | 9/2015 | Mangiat et al. |
| 9,661,245 B2 * | 5/2017 | Kawano ............ H04N 5/3572 |
| 9,675,236 B2 | 6/2017 | McDowall |
| 2002/0014577 A1 | 2/2002 | Ulrich et al. |
| 2002/0089765 A1 | 7/2002 | Nalwa |
| 2003/0007254 A1 | 1/2003 | Tocci |
| 2003/0016334 A1 | 1/2003 | Weber et al. |
| 2003/0048493 A1 | 3/2003 | Pontifex et al. |
| 2003/0072011 A1 | 4/2003 | Shirley |
| 2004/0119020 A1 | 6/2004 | Bodkin |
| 2004/0125228 A1 | 7/2004 | Dougherty |
| 2004/0179834 A1 | 9/2004 | Szajewski et al. |
| 2005/0001983 A1 | 1/2005 | Weber et al. |
| 2005/0041113 A1 | 2/2005 | Nayar et al. |
| 2005/0099504 A1 | 5/2005 | Nayar et al. |
| 2005/0151860 A1 | 7/2005 | Silverstein et al. |
| 2005/0168578 A1 | 8/2005 | Gobush |
| 2005/0212827 A1 | 9/2005 | Goertzen |
| 2005/0219659 A1 | 10/2005 | Quan |
| 2006/0001761 A1 | 1/2006 | Haba et al. |
| 2006/0002611 A1 | 1/2006 | Mantiuk et al. |
| 2006/0061680 A1 | 3/2006 | Madhavan et al. |
| 2006/0104508 A1 | 5/2006 | Daly et al. |
| 2006/0184040 A1 | 8/2006 | Keller et al. |
| 2006/0209204 A1 | 9/2006 | Ward |
| 2006/0221209 A1 | 10/2006 | McGuire et al. |
| 2006/0262275 A1 | 11/2006 | Domroese et al. |
| 2007/0025717 A1 | 2/2007 | Raskar et al. |
| 2007/0086087 A1 | 4/2007 | Dent et al. |
| 2007/0189750 A1 | 8/2007 | Wong et al. |
| 2007/0189758 A1 | 8/2007 | Iwasaki |
| 2007/0258641 A1 | 11/2007 | Srinivasan et al. |
| 2008/0013051 A1 | 1/2008 | Glinski et al. |
| 2008/0030611 A1 | 2/2008 | Jenkins |
| 2008/0055683 A1 | 3/2008 | Choe et al. |
| 2008/0094486 A1 | 4/2008 | Fuh et al. |
| 2008/0100910 A1 | 5/2008 | Kim et al. |
| 2008/0112651 A1 | 5/2008 | Cho et al. |
| 2008/0198235 A1 | 8/2008 | Chen et al. |
| 2008/0198266 A1 | 8/2008 | Kurane |
| 2009/0059048 A1 | 3/2009 | Luo et al. |
| 2009/0213225 A1 | 8/2009 | Jin et al. |
| 2009/0290043 A1 | 11/2009 | Liu et al. |
| 2010/0201799 A1 | 8/2010 | Mohrholz et al. |
| 2010/0225783 A1 | 9/2010 | Wagner |
| 2010/0271512 A1 | 10/2010 | Garten |
| 2010/0328780 A1 | 12/2010 | Tocci |
| 2011/0028278 A1 | 2/2011 | Roach |
| 2011/0058050 A1 | 3/2011 | Lasang et al. |
| 2011/0188744 A1 | 8/2011 | Sun |
| 2011/0194618 A1 | 8/2011 | Gish et al. |
| 2012/0025080 A1 | 2/2012 | Liu et al. |
| 2012/0134551 A1 | 5/2012 | Wallace |
| 2012/0147953 A1 | 6/2012 | El-Mahdy et al. |
| 2012/0212964 A1 | 8/2012 | Chang et al. |
| 2012/0241867 A1 | 9/2012 | Ono et al. |
| 2013/0063300 A1 | 3/2013 | O'Regan et al. |
| 2013/0093805 A1 | 4/2013 | Iversen |
| 2013/0215290 A1 * | 8/2013 | Solhusvik ............ H04N 5/2355 348/231.99 |
| 2013/0250113 A1 | 9/2013 | Bechtel et al. |
| 2013/0286451 A1 | 10/2013 | Verhaegh |
| 2013/0329053 A1 | 12/2013 | Jones et al. |
| 2014/0002694 A1 | 1/2014 | Levy et al. |
| 2014/0063300 A1 | 3/2014 | Lin et al. |
| 2014/0085422 A1 | 3/2014 | Aronsson et al. |
| 2014/0132946 A1 | 5/2014 | Sebastian et al. |

(56) References Cited

U.S. PATENT DOCUMENTS

| | | | |
|---|---|---|---|
| 2014/0152694 A1 | 6/2014 | Narasimha et al. | |
| 2014/0198187 A1 | 7/2014 | Lukk | |
| 2014/0210847 A1 | 7/2014 | Knibbeler et al. | |
| 2014/0263950 A1 | 9/2014 | Fenigstein et al. | |
| 2014/0313369 A1 | 10/2014 | Kageyama et al. | |
| 2015/0201222 A1 | 7/2015 | Mertens | |
| 2015/0208024 A1 | 7/2015 | Takahashi et al. | |
| 2015/0296140 A1* | 10/2015 | Kim | H04N 5/23238 348/38 |
| 2015/0302562 A1 | 10/2015 | Zhai | |
| 2015/0312498 A1* | 10/2015 | Kawano | H04N 5/3572 348/222.1 |
| 2015/0312536 A1 | 10/2015 | Butler et al. | |
| 2016/0050354 A1 | 2/2016 | Musatenko et al. | |
| 2016/0057333 A1 | 2/2016 | Liu et al. | |
| 2016/0163356 A1 | 6/2016 | De Haan et al. | |
| 2016/0173811 A1 | 6/2016 | Oh et al. | |
| 2016/0205368 A1 | 7/2016 | Wallace et al. | |
| 2016/0323518 A1 | 11/2016 | Rivard et al. | |
| 2016/0345032 A1 | 11/2016 | Tsukagoshi | |
| 2016/0353123 A1 | 12/2016 | Ninan | |
| 2016/0360212 A1 | 12/2016 | Dai et al. | |
| 2017/0006273 A1 | 1/2017 | Borer et al. | |
| 2017/0070719 A1 | 3/2017 | Smolic et al. | |
| 2017/0126987 A1 | 5/2017 | Tan et al. | |
| 2017/0238029 A1* | 8/2017 | Kiser | H04N 1/603 725/146 |

FOREIGN PATENT DOCUMENTS

| | | | |
|---|---|---|---|
| EP | 1225574 A2 | 7/2002 | |
| EP | 1395062 A1 | 3/2004 | |
| JP | S53093026 A | 8/1978 | |
| JP | S53124028 A | 10/1978 | |
| JP | S60213178 A | 10/1985 | |
| JP | S63160489 A | 7/1988 | |
| JP | H0468876 A | 3/1992 | |
| JP | H0564070 A | 3/1993 | |
| JP | H06335006 A | 12/1994 | |
| JP | H07107346 A | 4/1995 | |
| JP | H11127441 A | 5/1999 | |
| JP | 2000019407 A | 1/2000 | |
| JP | 2000338313 A | 12/2000 | |
| JP | 2001136434 A | 5/2001 | |
| JP | 2002165108 A | 6/2002 | |
| JP | 2003035881 A | 2/2003 | |
| JP | 2007295326 A | 11/2007 | |
| WO | 2005025685 A1 | 3/2005 | |
| WO | 2009/111642 A1 | 9/2009 | |
| WO | 2009/121068 A2 | 10/2009 | |
| WO | 2011/032028 A2 | 3/2011 | |
| WO | 2012/076646 A1 | 6/2012 | |
| WO | 2015/072754 A1 | 5/2015 | |
| WO | 2015/173570 A1 | 11/2015 | |

OTHER PUBLICATIONS

Abstract of JP 2003035881 A (2 pages).
Abstract of JP S60213178 A (2 pages).
Aggarwal, 2004, Split Aperture Imaging for High Dynamic Range, Int J Comp Vis 58(1):7-17.
Alleysson, 2006, HDR CFA Image Rendering, Proc EURASIP 14th European Signal Processing Conf.
Banterle, 2009, High dynamic range imaging and low dynamic range expansion for generating HDR content, Eurographics State of the The Art Report (18 pages).
Debevec, 1997, Recovering High Dynamic Range Radiance Maps from Photographs, Int Conf Comp Graphics and Interactive Techniques, proceedings.
Flux Data Inc, 2008, FD-1665 High Resolution 3 CCD Multispectral Industrial Camera, web.archive. orgweb20080113023949www.fluxdata.com/prod (7 pages).
International Search Report and Written Opinion dated Apr. 14, 2017, for PCT/US17/17396 filed Feb. 10, 2017 (9 pages).
International Search Report and Written Opinion dated Apr. 28, 2017, for PCT/US17/17405, filed Feb. 10, 2017 (9 pages).
International Search Report and Written Opinion dated May 2, 2017, for PCT/US17/16991, filed Feb. 8, 2017 (7 pages).
International Search Report and Written Opinion dated May 8, 2017, for PCT/US17/17400 filed Feb. 10, 2017 (8 pages).
International Search Report and Written Opinion dated Oct. 23, 2017, for International application No. PCT/US17/45683, with International filing date Aug. 7, 2017 (5 pages).
Kao, 2008, High Dynamic Range Imaging by Fusing Multiple Raw Images and Tone Reproduction, IEEE Transactions on Consumer Electronics 54(1):10-15.
Lukac, 2004, Demosaicked Image Postprocessing Using Local Color Ratios, IEEE Transactions on Circuits and Systems for Video Technology 14(6):914-920.
Machine translation of CN 101344706 B, generated on May 19, 2017, by espacenet (11 pages).
Machine translation of JP 2000019407 A generated on May 30, 2017, by EPO website (52 pages).
Machine translation of JP 2000338313 A generated on Dec. 21, 2016, by Espacenet (9 pages).
Machine translation of JP 2001136434 A generated on Dec. 21, 2016, by Espacent (25 pages).
Machine translation of JP 2002165108 A generated on Dec. 21, 2016, by Espacenet (27 pages).
Machine translation of JP 2003035881 A genertaed on May 30, 2017, by EPO website (19 pages).
Machine translation of JP 2007295326 A generated on Dec. 21, 2016, by the European Patent Office website Espacent (12 pages).
Machine translation of JP H04068876 A generated on Dec. 21, 2016, by Espacent (8 pages).
Machine translation of JP H0564070 A generated on Dec. 21, 2016, by Espacenet (19 pages).
Machine translation of JP H06335006 A generated on Dec. 21, 2016, by Espacenet (9 pages).
Machine translation of JP H07107346 generated on Dec. 21, 2016, by Espacent (21 pages).
Machine translation of JP S53093026 A, issued as JP S599888, generated on Dec. 21, 2016 (5 pages).
Machine translation of JP S60213178 A generated on May 30, 2017, by EPO website (6 pages).
Myszkowki, 2008, High Dynamic Range Video, Morgan & Claypool Publishers, San Rafael, CA (158 pages).
Nayar, 2000, High dynamic range imaging: spatially varying pixel exposures, 2000 Proc IEEE Conf on Comp Vision and Pattern Rec, ISSN: 1063-6919.
Stumpfel, 2004, Direct HDR Capture of the Sun and Sky, Computer graphics, virtual reality, visualisation and interaction in Africa (9 pages).
Tiwari, 2015, A review on high-dynamic range imaging with its technique, Int J Sig Proc, IPPR 8(9):93-100.
Tocci, 2011, A versatile HDR video production system, ACM Transactions on Graphics (TOG)—Proceedings of ACM SIG-GRAPH 2011, 30(4):article 41.
Touze, 2014, HDR video coding based on local LDR quantization, Second International Conference and SME Workshop on HDR imaging.

\* cited by examiner

GARDEN STATE PARKWAY

US 10,554,901 B2

REAL-TIME HDR VIDEO FOR VEHICLE CONTROL

CROSS-REFERENCE TO RELATED APPLICATION

This application claims priority to U.S. Provisional Application Ser. No. 62/372,527, filed Aug. 9, 2016, the contents of which is incorporated by reference.

TECHNICAL FIELD

The invention relates to systems for autonomous vehicles.

BACKGROUND

A number of companies have manufactured autonomous (i.e., self-driving) vehicles. The state of Nevada has declared that self-driving cars and trucks may legally use the roads. It is possible that other states will follow Nevada's lead and allow any number of autonomous taxis, tractor-trailers, private luxury cars, and other such vehicles onto the roads.

Unfortunately, autonomous vehicles are subject to many of the same limitations as traditional cars. For example, even if a vehicle is driven carefully, there is a risk of an accident that comes with driving in an unpredictable environment. Additionally, physical limits such as visibility or traction apply to autonomous vehicles just as to traditional cars. Sudden darkness, indiscernible roadway markers, intense cloudbursts or white-out snow conditions, as well as dark clothing or dark-colored animals at night are all examples things that can interfere with the ability of a vehicle to safely navigate the streets. Even autonomous vehicles that use LIDAR and RADAR in combination with cameras are susceptible to accidents in a variety of poor conditions. There is a need, therefore, for improved technology to aid in broad implementation and use of autonomous vehicles.

SUMMARY

The invention provides systems for autonomous vehicles that make use of real-time, high-dynamic range (HDR) cameras. An HDR camera for use in the invention comprises pipeline processing of pixel values from multiple image sensors to provide a view of a vehicle's environment in real-time, in a frame independent manner, as the vehicle operates. As pixel values are provided by the camera's image sensors, those values are streamed directly through a pipeline processing operation and on to the HDR system without any requirement to wait and collect entire images, or frames, before using the video information. The pipeline operates to merge images taken at different light levels by replacing saturated parts of an image with corresponding parts of a lower-light image to stream a video with a dynamic range that extends to include very low-light and very intensely lit parts of a scene. Because the dynamic range is high, the vehicle detects dim, hard to discern features, even if a scene is dominated by bright light such as oncoming vehicle headlights or the sun. The HDR video camera may be the primary road-viewing system of the vehicle or it may work in conjunction with other detection systems such as panoramic cameras or detection and range-finding systems like LIDAR or RADAR.

By using a real-time, streaming HDR video camera, the HDR system can detect and interpret features in the environment rapidly enough that the vehicle can be controlled in response to those features. Not only can, for example, poorly lit road signs be read by the system, unexpected hazards can be seen and processed in time for accidents to be avoided. Because the camera is HDR, hazards may be detected even where the environment would make human visual detection difficult or impossible. Since multiple sensors are operating at different light levels, even where a blinding sun appears in-scene, a low exposure sensor can form an image of obstacles on the road. Since the camera streams the HDR video through to the control system in real time, the control system can respond to sudden changes in the environment. For example, the vehicle can apply the brakes if an object unexpectedly appears in the roadway. Since the vehicle detects and interprets difficult to see objects, and since the vehicle is able to react to unexpected features in real time, costly crashes will be avoided. The operation of autonomous vehicles will be safer, making those vehicles suitable for a wide range of commercial and recreational uses.

In certain aspects, the invention provides an HDR system for a vehicle. The system includes an HDR camera operable to produce a real-time HDR video and a processing system. The processing system communicates with the HDR camera and a control system of a vehicle. Using the HDR video, the processing system determines an appearance of an item in an environment of the vehicle and issues to the control system an instruction that directs a change in the operation of the vehicle based on the appearance of the item.

The HDR system can be an installed, OEM part of a vehicle as the vehicle is shipped from a factory. The HDR system can be a component sold to OEM vehicle manufacturers, e.g., to be integrated into a vehicle on the assembly line or added as a dealer option. The HDR system can be an after-market accessory sold, for example, to a consumer to be used with an existing vehicle.

The HDR system offers functionality that may be employed in fully autonomous vehicles, as part of a driver assistance feature, or to provide accessory functionality outside of the primary driving functions, such as by augmenting a vehicle's navigational, safety, or entertainment systems. The HDR system may read lane markings and assist in keeping a vehicle in-lane. The system may, for example, use an HDR camera to read street signs or other landmarks to provide navigational assistance. Additionally or alternatively, the HDR camera may be used to detect and interpret road conditions such as dips, bumps, potholes, construction, metal plates, etc., and set up a car's electronic suspension damping for such features. The system may use one or more HDR cameras to collect information and feed the information to a server for, for example, a larger cartographical projects, such as building a road and business database for a navigational or emergency service system. In preferred embodiments, the HDR camera-based system is used to improve the utility and safety of fully autonomous vehicles. As discussed in greater detail herein, a fully autonomous vehicle can use the HDR video camera-based system to fully see and interpret all manner of detail in the road and environment, providing for optimized safety and efficiency in operation.

The HDR system may be provided as part of, or for use in, an automobile, such as a consumer's "daily driver" or in a ride-sharing or rental car. Such a vehicle will typically have 2 to 7 seats and a form factor such as a sedan, compact SUV or CUV, SUV, wagon, coupe, small truck, roadster, or sports car. Additionally or alternatively, the HDR system may be provided as part of, or for use in, a cargo truck, semi truck, bus, or other load carrying vehicle. The HDR system may be provided as part of, or for use in, a military or emergency response vehicle, such as a HUMVEE, tank, jeep, fire truck, police vehicle, ambulance, bomb squad vehicle, troop transport, etc. The HDR system may be provided as part of, or for use in, a utility vehicle such as a forklift, warehouse robot in a distribution facility, office mail cart, golf cart, personal mobility device, autonomous security vehicle, Hollywood movie dolly, amusement park ride, tracked or trackless mine cart, or others. The HDR system may be provided as part of, or for use in, a non-road-going vehicle, such as a boat, plane, train or submarine. In fact, it may be found that the HDR camera offers particular benefits for vehicles that operate in lighting conditions not well suited to the human eye, such as in the dark, among rapidly flashing lights, extremely bright lights, unexpected or unpredictable lighting changes, flashing emergency lights, light filtered through gels or other devices, night-vision lighting, etc. Thus, compared to vehicles controlled solely by a human, a vehicle using the control system may perform better in environments such as night, underground, Times Square, lightning storms, house fires or forest fires, emergency road conditions, military battles, deep-sea dives, mines, etc.

The HDR system may be provided as part of, or for use in, a military or emergency vehicle. The real-time HDR video camera provides the ability to detect and respond to a variety of inputs that a human would have difficulty processing, such as large numbers of inputs in a busy environment, or hard to detect inputs, such as very small things far away. As but one example, a squadron of airplanes using the HDR systems could detect and respond to each other as well as to ambient clouds, birds, topography, etc., to fly in perfect formation for long distances, e.g., and even maintain a formation while flying beneath some critical altitude over varying topography. In some embodiments, the HDR system is for a military or emergency vehicle and provides an autopilot or assist functionality. An operator can set the system to control the vehicle for a time. Additionally or alternatively, the system can be programmed to step in for an operator should the operator lose consciousness, get distracted, hit a panic button, etc. For example, the system can be connected to an eye tracker or physiological sensor such as a heart rate monitor, and can initiate a backup operation mode should such sensor detect values over a certain threshold (e.g., extremely low or elevated heart rate; exaggerated or suppressed eye movements or eye movements not directed towards an immediate path of travel). The system can be operated to place a vehicle in a holding pattern, e.g., fly in a high-altitude circle for a few hours while a pilot sleeps. It will be appreciated that a wide variety of features and functionality may be provided by the vehicle.

In preferred embodiments, the system includes the real-time HDR video camera and a processing system that communicates with the camera and a control system of a vehicle. The control system of the vehicle will typically include a vehicle's OEM electronic control unit (ECU), e.g., a hardware unit including memory coupled to a processor that is installed in a vehicle (e.g., bolted to the firewall) and controls functions such as fuel injection mapping, torque sensing/torque vectoring, steering, etc. The HDR camera's processing system is programmed to "talk to" the vehicle ECU. It is understood that vehicles may have one or more units providing ECU functionality. As used herein, ECU may be taken to refer to all such units operating together on a vehicle.

In preferred embodiments, the HDR camera has a plurality of image sensors coupled to a processing device (which in turn may be linked to the processing system). The HDR camera streams pixel values from the image sensors in a frame-independent manner through a pipeline on the processing device. The pipeline includes a kernel operation that identifies saturated pixel values and a merge module to merge the pixel values to produce the HDR video in real-time.

The camera may be mounted stationary on the vehicle. The camera may look in direction, or it may move. For example, the camera may rotate in 360 degrees. The HDR camera may be a 360-degree camera that captures a 360-degree view around the vehicle, e.g., either a stationary 360 degree camera that captures a ring-shaped image, or a directional camera that rotates. In embodiments wherein the captured 360-degree view is ring-shaped, the processing system may perform a de-warping process to convert the 360-degree view into a rectangular panoramic image (e.g., for display to human).

In certain embodiments, the system is operable to work in conjunction with, or include, a detection and ranging sensor (generally a RADAR or LIDAR sensor). The processing system may be operable to detect an object with the detection and ranging sensor, detect the object with HDR camera, and correlate an image of the object in the HDR video with a detected range of the object determined via the detection and ranging system.

The system provides a variety of features and benefits. For example, an HDR camera system may be particularly adept at operating in high glare conditions. E.g. driving through a city during evening rush hour, the processing system may be operable to detect glare in the environment within the 360-degree view and use the HDR camera to capture an HDR image of a portion of the environment affected by the glare. The system may be particularly adept at responding to situations where light levels provide important information. For example, the HDR camera can detect an appearance of an item such as a taillight of another vehicle and detect an illumination status of the taillight. Even where the HDR video includes a direct or reflected view of the sun, the HDR camera can detect the presence of a moving object in scene.

The HDR camera itself preferably includes a lens and at least one beamsplitter. The plurality of image sensors includes at least a high exposure (HE) sensor and a middle exposure (ME) sensor. The HE sensor, the ME sensor, the lens and the at least one beamsplitter may be arranged to receive an incoming beam of light and split the beam of light into at least a first path that impinges and HE sensor and a second path that impinges on the ME sensor. The beamsplitter directs a majority of the light to the first path and a lesser amount of the light to the second path. In preferred embodiments, the first path and the second path impinge on the HE and the ME sensor, respectively, to generate images that are optically identical but for light level. The processing device of the HDR camera may be a field-programmable gate array or an application-specific integrated circuit that includes the pipeline. In some embodiments, the kernel operation operates on pixel values as they stream from each of the plurality of image sensors by examining, for a given pixel on the HE sensor, values from a neighborhood of pixels surrounding the given pixel, finding saturated values in the neighborhood of pixels, and using information from a corresponding neighborhood on the ME sensor to estimate a value for the given pixel. Optionally, the pipeline may include—in the order in which the pixel values flow: a sync module to synchronize the pixel values as the pixel values stream onto the processing device from the plurality of image sensors; the kernel operation; the merge module; a demosaicing module; and a tone-mapping operator.

In certain aspects, the invention provides a vehicle that includes an HDR camera operable to produce a real-time HDR video, a control system configured for operation of the vehicle; and a processing system. The processing system is operable to determine, based on the HDR video, an appearance of an item in an environment of the vehicle and cause the control system to make a change in the operation of the vehicle based on the appearance of the item. Preferably, the HDR camera includes a plurality of image sensors coupled to a processing device, with the HDR camera being configured to stream pixel values from each of the plurality of image sensors in a frame-independent manner through a pipeline on the processing device, wherein the pipeline includes a kernel operation that identifies saturated pixel values and a merge module to merge the pixel values to produce the HDR video in real-time.

The vehicle may include a 360-degree camera that captures a 360-degree view around the vehicle. In some embodiments, the captured 360-degree view is ring-shaped and the processing system performs a de-warping process to convert the 360-degree view into a rectangular panoramic image. The 360-degree camera may itself be a real-time HDR video camera that performs the pipeline processing. Additionally or alternatively, the HDR video camera may complement the operation of the 360-degree camera. For example, the processing system may detect glare in the environment within the 360-degree view and use the HDR camera to capture an HDR image of a portion of the environment affected by the glare. Systems of the invention may also include separate linked cameras placed at discreet positions on the vehicle.

In some embodiments, the vehicle includes a detection and ranging sensor, such as a RADAR or LIDAR device. The processing system detects an object with both the detection and ranging sensor as well as with the HDR camera, and correlates an image of the object in the HDR video with a detected range of the objection determined via the detection and ranging system.

The processing system and the control system make a change in the operation of the vehicle based on the appearance of the item. In one example, the item is a taillight of another vehicle and determining the appearance includes detecting an illumination status of the taillight. In another example, the HDR video includes the sun, the item is a moving object, and determining the appearance includes determining that the item is present.

In preferred embodiments, the HDR camera uses multiple image sensors and a single lens. The image sensors all capture images that are identical (e.g., in composition and exposure time) but for light level. The HDR camera may include a lens and at least one beamsplitter. The plurality of image sensors preferably includes at least a high exposure (HE) sensor and a middle exposure (ME) sensor. The HE sensor, the ME sensor, the lens and the at least one beamsplitter may be arranged to receive an incoming beam of light and split the beam of light into at least a first path that impinges and HE sensor and a second path that impinges on the ME sensor. The beamsplitter directs a majority of the light to the first path and a lesser amount of the light to the second path. The first path and the second path impinge on the HE and the ME sensor, respectively, to generate images that are optically identical but for light level.

In certain embodiments, the processing device comprises a field-programmable gate array or an application-specific integrated circuit that includes the pipeline. The kernel operation may operate on pixel values as they stream from each of the plurality of image sensors by examining, for a given pixel on the HE sensor, values from a neighborhood of pixels surrounding the given pixel, finding saturated values in the neighborhood of pixels, and using information from a corresponding neighborhood on the ME sensor to estimate a value for the given pixel. In some embodiments, the pipeline includes—in the order in which the pixel values flow: a sync module to synchronize the pixel values as the pixel values stream onto the processing device from the plurality of image sensors; the kernel operation; the merge module; a demosaicing module; and a tone-mapping operator. The pipeline may further include one or more of a color-correction module; an HDR conversion module; and an HDR compression module.

Aspects of the invention provide a method for operating a vehicle. The method includes receiving light via an HDR camera on a vehicle. The beamsplitter splits the light onto a plurality of image sensors that capture values for each of a plurality of pixels on the sensors. As well as the splitting step, the method preferably includes streaming the pixel values to the processing device that uses a kernel operation to identify saturated pixel values and a merge module to merge the pixel values to produce the HDR video in real-time. The method may include demosaicing the video. The method includes determining, by the processing system and based on the HDR video, an appearance of an item in an environment of the vehicle and causing the control system to make a change in the operation of the vehicle based on the appearance of the item. The vehicle is preferably an autonomous vehicle.

DETAILED DESCRIPTION

Figure 1:
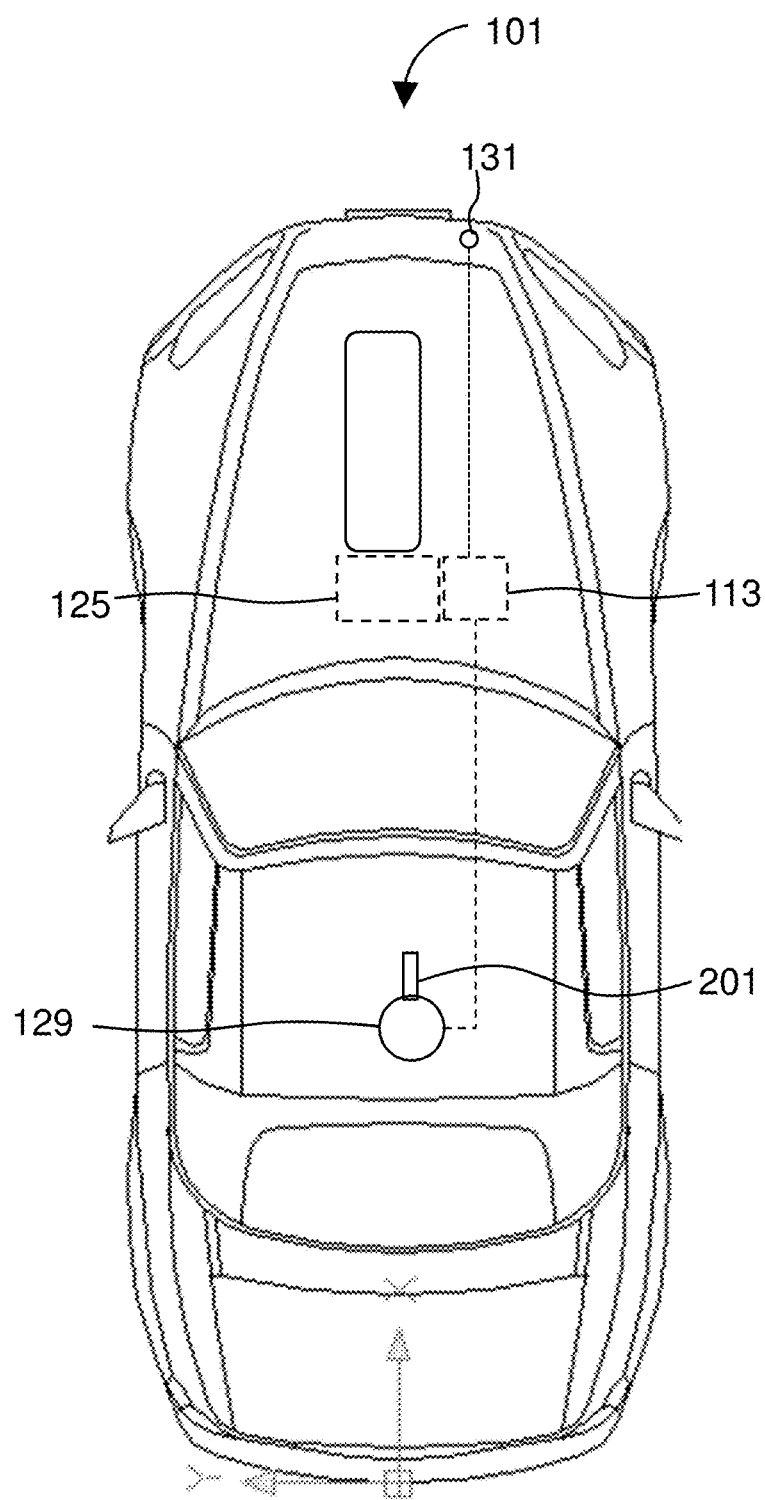
FIG. 1 shows a vehicle that includes a real-time HDR video camera.

Autonomous vehicles use a variety of digital sensors as part of an overall Advanced Driver Assistance Systems (ADAS). ADAS relies on inputs from multiple data sources and sensors in order to make driving decisions. ADAS are included in a vehicle to automate, adapt, or enhance vehicle systems for safety and better driving. ADAS include features designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS or traffic warnings, connect to smartphones, alert the driver to other cars or dangers, keep the vehicle in the correct lane, or monitor what is in "blind spots". As used herein, ADAS can be taken to refer to all of the components that operate together to control the vehicle (e.g., cameras, plus ECUs, plus detectors, etc.). Components of ADAS may be built into cars, added as aftermarket add-on packages, or combinations of both. ADAS may use inputs from multiple data sources, including automotive imaging, LiDAR, radar, image processing, computer vision, and in-car networking. Additional inputs are possible from other sources separate from the primary vehicle platform, such as other vehicles, referred to as Vehicle-to-vehicle (V2V), or Vehicle-to-Infrastructure (such as mobile telephony or Wi-Fi data network) systems.

Here is provided a control system for an autonomous vehicle with a real-time HDR video camera that can be integrated into the ADAS. The use of real-time HDR video may increase the quality of the data from all the imaging sensors throughout an ADAS by increasing contrast ratio, color information, and critical details needed for safety functions while keeping bandwidth and latency low (real-time).

The HDR system offers functionality that may be employed in fully autonomous vehicles, as part of a driver assistance feature, or to provide accessory functionality outside of the primary driving functions, such as by augmenting a vehicle's navigational, safety, or entertainment systems. The system may, for example, use an HDR camera to read street signs or other landmarks to provide navigational assistance. Additionally or alternatively, the HDR camera may be used to detect and interpret road conditions such as dips, bumps, potholes, construction, metal plates, etc., and set up a car's electronic suspension damping for such features. The system may use one or more HDR cameras to collect information and feed the information to a server for, for example, larger cartographical projects, such as building a road and business database for a navigational or emergency service system. In preferred embodiments, the HDR camera-based system is used to improve the utility and safety of fully autonomous vehicles. As discussed in greater detail herein, a fully autonomous vehicle can use the HDR video camera-based system to fully see and interpret all manner of detail in the road and environment, providing for optimized safety and efficiency in operation.

Embodiments of the invention provide an HDR system for a military vehicle. The system includes an HDR camera operable to produce a real-time HDR video and a processing system. The processing system communicates with the HDR camera and a control system of a vehicle. Using the HDR video, the processing system determines an appearance of an item in an environment of the vehicle and issues to the control system an instruction that directs a change in the operation of the vehicle based on the appearance of the item. The processing system can be programmed to interface with a weapons or target-tracking system, a navigational system, the control system, or combinations thereof. The vehicle may be, for example, a Humvee or troop transport that uses the real-time HDR video camera to essentially see in difficult lighting conditions and drive through hostile terrain. The HDR video camera can provide a display for a human operator, the vehicle can be autonomous, or the vehicle can have autonomous systems assist a human operator. Because the camera is HDR, sudden flashes of bright light such as explosions do not impair the ability of the HDR system to see and navigate the environment.

Embodiments of the invention provide an HDR system for a boat. The system includes an HDR camera operable to produce a real-time HDR video and a processing system. The processing system communicates with the HDR camera and a control system of the boat. Using the HDR video, the processing system determines an appearance of an item in an environment of the boat and issues to the control system an instruction to control the boat based on the appearance of the item. Boats are essentially surrounded by water and do not offer the same visual cues as roadways. Swells and valleys among waves, with breaking crests and sea foam in the air can present a scene of sudden bright sun glints and rapidly changing contrast scenes without the types of anchor points the human eye expects to see. A human may be so consumed attempting to navigate a harbor as to lack the residual attention to understand the water's urges. Moreover, reading the crests and troughs and what all the buoys signify may be difficult for a human due essentially to strange patterns (both spatial and temporal) of visual contrast in the great volume of the sea. Additionally the ceaseless roiling of endless waves may afford no purchase to the balancing tools of the inner ear, causing a human operator to lack the kinesthetic sense necessary to correctly perceive an absolute frame of reference including down and up and left and right. The HDR system may read surfaces of the waves, detect and interpret buoys and other navigational markers, and aid in controlling the boat. Optionally, the HDR system may communicate with a global positioning system, compass, level, or other such instruments to maintain an absolute reference frame. The system may interact with, or include, sonar systems that can read the ocean floor or look forward to obstacles. The processing system can synthesize this information and offer such useful benefits as, for example, an autopilot mode that drives a boat from slip to sea, navigating out of the harbor.

Embodiments of the invention provide an HDR system that provides an autopilot mode for a vehicle such as a boat, plane, or road-going vehicle. The system includes an HDR camera operable to produce a real-time HDR video and a processing system. The processing system communicates with the HDR camera and a control system of a vehicle. Using the HDR video, the processing system identifies items in an environment, navigational goals, landmarks, etc., and controls operation of the vehicle without human participation.

FIG. 1 shows a vehicle 101 that includes an HDR system comprising an HDR camera 201 and a processing system 113. The HDR camera 201 generates real-time HDR video. The HDR camera 201 communicates with a control system 125 configured for operation of the vehicle through a processing system 113. The control system 125 generally includes or interacts with the throttle, brakes, steering, etc., that operate the vehicle 101. The control system 125 can be taken to include the electronic control unit (ECU) that operates the fuel-injectors, as well as the systems, motors, switches and computers that directly operate the vehicle 101. The processing system 113 includes the processors (e.g., chips), memory, programming, assets (e.g., maps, learned patters, etc.) that are used in connection with images from the HDR camera 201 to make meaningful decisions based on information from those images.

The HDR system can be an installed, OEM part of a vehicle as the vehicle is shipped from a factory. The HDR system can be a component sold to OEM vehicle manufacturers, e.g., to be integrated into a vehicle on the assembly line or added as a dealer option. The HDR system can be an after-market accessory sold, for example, to a consumer to be used with an existing vehicle. Once installed on a vehicle, the HDR system can be considered to be part of the vehicle's ADAS.

The ADAS include the control system 125 and the processing system 113. The vehicle 101 optionally includes as part of the ADAS a detection and ranging sensor 131, such as a RADAR device, a LIDAR device, others, or combinations thereof. The processing system 113 determines based, on the HDR video, an appearance of an item in an environment of the vehicle and causes the control system to make a change in the operation of the vehicle based on the appearance of the item. In preferred embodiments, the HDR camera 201 comprises a plurality of image sensors coupled to a processing device, and the HDR camera 201 is configured to stream pixel values from each of the plurality of image sensors in a frame-independent manner through a pipeline on the processing device. As discussed in greater detail below, the pipeline includes a kernel operation that identifies saturated pixel values and a merge module to merge the pixel values to produce the HDR video in real-time. The vehicle 101 may also include a 360-degree camera 129 that captures a 360-degree view around the vehicle.

The HDR system may be provided as part of, or for use in, any suitable vehicle including road-going cars and trucks such as consumer automobiles and work vehicles (e.g., semi trucks, buses, etc.) In certain embodiments, the HDR system is provided as part of, or for use in, a military or emergency response vehicle (e.g., jeep, ambulance, troop transport, HUMVEE). The HDR system may be provided as part of, or for use in, a utility vehicle such as a forklift or personal mobility device. The HDR system may be provided as part of, or for use in, a non-road-going vehicle, such as a boat, plane, train or submarine.

The HDR system offers benefits in "seeing" across a very high dynamic range including over a dynamic range greater than what can be perceived by the human eye and mind. Not only can the HDR system detect items across a greater dynamic range than a human, but the system is not subject to perception problems caused by limits in human consciousness and thought processes. For example, where some remarkable spectacle lies in the periphery of human perception, such as a bad car crash on the side of the road, it a human tendency to turn attention to that spectacle at the expense of attention to the upcoming road. The HDR system is not subject to that phenomenon. Where a human pays attention to a spectacle, he or she may pay residual attention to the road ahead, but features in the road characterized by limited contrast (a white truck crossing the street with a bright sky background) may not cross the threshold for human perception. Where a vehicle is equipped with a traditional camera, a white truck against a bright white sky background may not be perceived due to the limited contrast presented. Thus an HDR system addresses road-travel concerns presented by traditional cameras and limits of human perception. For those reasons, an HDR system may have particular benefit in environments with exaggerated lighting conditions, environments packed with stimulus, or other environments that include unexpected and hard-to-anticipate content.

For example, it may be found that the HDR camera offers particular benefits for vehicles that operate in lighting conditions not well suited to the human eye, such as in the dark, among rapidly flashing lights, extremely bright lights, unexpected or unpredictable lighting changes, flashing emergency lights, light filtered through gels or other devices, night-vision lighting, etc. Thus, compared to vehicles controlled solely by a human, a vehicle using the control system may perform better in environments such as night, underground, Times Square, lightning storms, house fires or forest fires, emergency road conditions, military battles, deep-sea dives, mines, etc. To give one example, it is a known issue in law enforcement that motorists strike police cars with unusual frequency. Without being bound by any mechanism, it may be theorized that the flashing lights of police vehicles, when sitting alongside the road, create a non-constant signal that defies the ability of human perception to extrapolate from. Where a traditional vehicle drives towards a stationary feature, the human mind projects the like relative positioning of that feature in the immediate future. The fact that police lights flash may defy the ability to make such a mental projection. Thus a driver may not be able to anticipate a path of travel that steers clear of a stopped vehicle with flashing lights. The HDR system is not subject to that limitation. The processing system 113 detects the police car lights regardless of brightness or flashing rate. Because the system is HDR, it is of minimal importance that the police car may be off to the side of the road in the dark. Because the HDR camera operates in real time, the system can project the relative positioning of the vehicles immediately in the future and avoid a collision.

By extension, it may be particularly valuable to include an HDR system on a military or emergency vehicle because those vehicles may be expected to operate near flashing lights frequently. The HDR system may be beneficial in any situation with extremes of light including extremes of timing (frequent pulses or flashes) or extremes of intensity.

Figure 2:
FIG. 2 illustrates a scene that may be recorded by the HDR camera.

FIG. 2 illustrates a scene that may be seen by a human sitting in the driver's seat of the vehicle 101 and also recorded by the HDR camera 201. In the depicted scene, the vehicle 101 is traveling West on a highway at a time soon before sunset. The sun appears near the horizon at the approximate vanishing point defined by the edges of the highway. Thus, to the human eye, the scene is dominated by a very bright source of light. By the nature of ocular physiology, the human eye undergoes adaptation to the light level. Because the scene is characterized by a high luminescence level, the human eye is operating in photopic vision using a cone mechanism (as compared to scotopic vision using a rod mechanism). As a result, the human eye is unable to discern certain features in the scene. In FIG. 2, a box is drawn with a dashed line to direct attention to a highway sign.

Figure 3:
FIG. 3 illustrates a highway sign as may be seen by the HDR camera.

FIG. 3 illustrates a highway sign as may be seen by the HDR camera 201. Since the HDR camera 201 is able to detect images across a high dynamic range, the highway sign can be imaged and interpreted even if other very bright objects are in the scene. Thus, optical character recognition or pattern recognition modules in the ADAS can interpret content of the sign as the vehicle 101 approaches the sign.

In the illustrated example, the ADAS may be operating under a preset set of navigational instructions that may have included the instruction to follow Interstate 85. Upon interpreting the highway sign, the vehicle 101 will be controlled to move into the appropriate lane as indicated by the sign.

Figure 4:
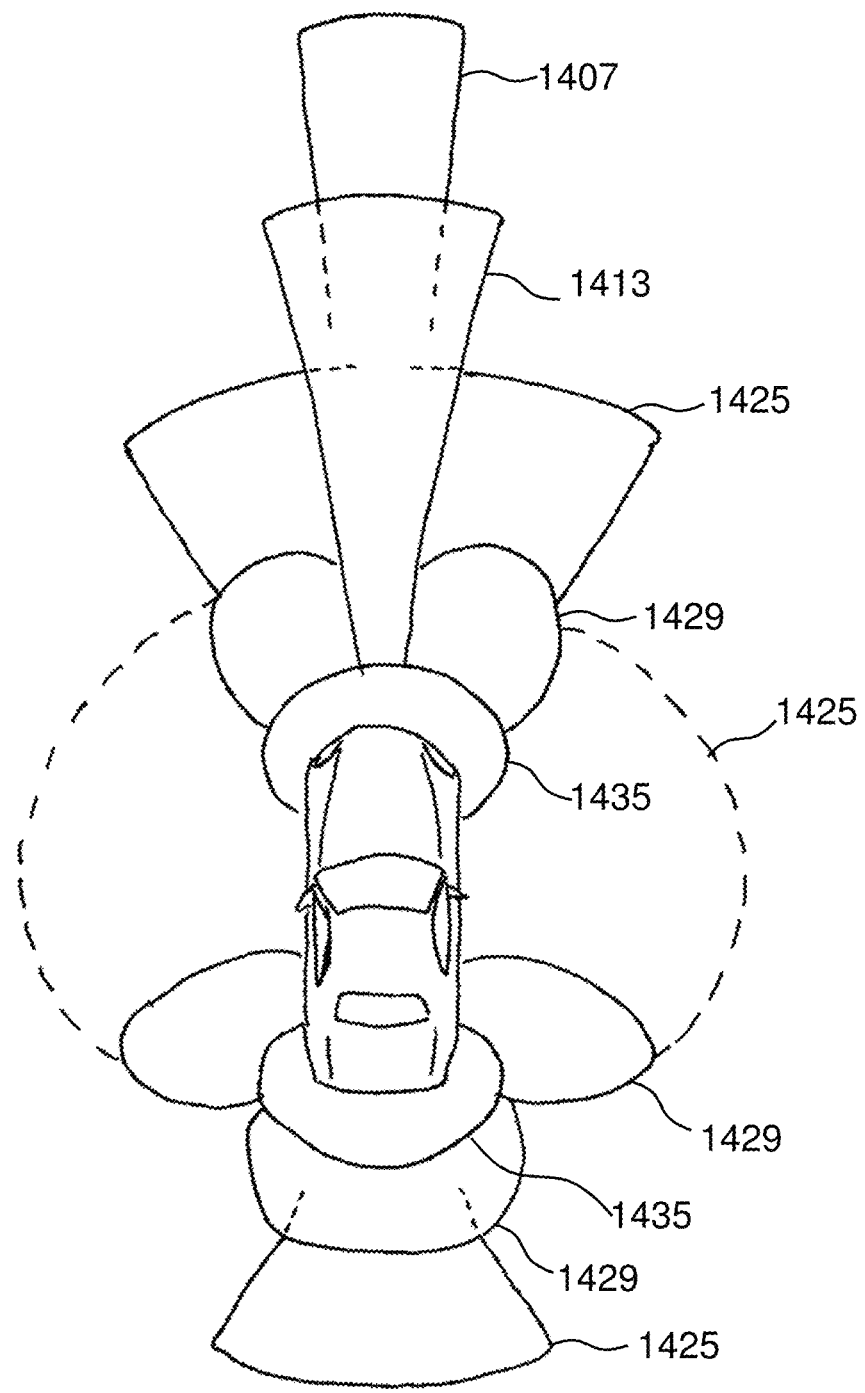
FIG. 4 diagrams field of view as offered by a variety of sensors in the vehicle.

FIG. 4 diagrams field of view as offered by a variety of sensors in the ADAS. The ADAS may include a long range radar system 1407, which may be used in adaptive cruise control. A LIDAR system 1413 may be used in emergency braking, pedestrian detection, and collision avoidance. The long range radar system 1407 and the LIDAR system 1413 are each examples of detection and range-finding systems and each may use one or more of a detection and ranging sensor 131.

Camera system 1425 may be used in traffic sign recognition, parking assistance, a surround view, and/or for lane departure warning. A short-range radar system 1429 (another detection and range-finding system) may be used to provide cross-traffic alerts. An ultrasound system 1435 may be included for, for example, parking assistance. The HDR camera 201 may be included in any of these systems. In preferred embodiments, the HDR camera is included as a component for either or both of the LIDAR system 1413 and the camera system 1425.

While the HDR camera 201 may include a "standard" field of view, in some embodiments, an HDR camera is used for the 360-degree camera 129. While various embodiments are within the scope of the invention, in some embodiments, the 360-degree camera 129 streams a real-time HDR video that possesses substantially a "ring" shape.

Figure 5:
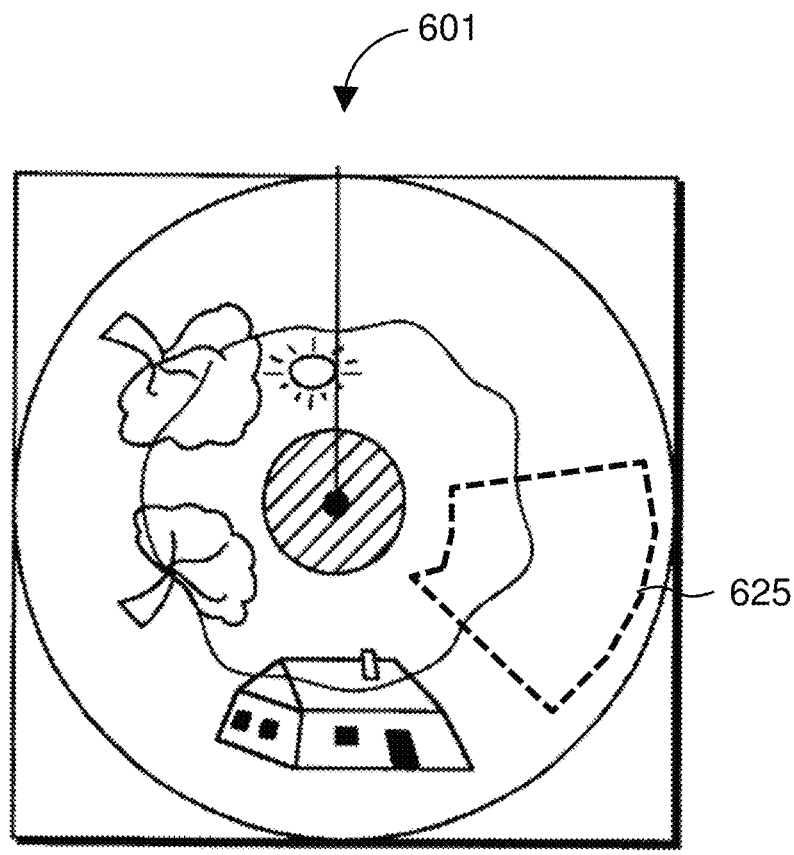
FIG. 5 shows a ring-shaped view captured by a 360-degree camera.

FIG. 5 shows ring-shaped view 601 captured by the 360-degree camera 129. In some embodiments, the processing system 113 performs a de-warping process to convert the 360-degree view into a rectangular panoramic image. It may be found that de-warping is not necessary, and it may be beneficial for the control system 125 to use the ring-shaped view 601 for operation of the vehicle. The control system 125 may be indifferent to the view and capable of detecting and interpreting important features using the ring-shaped real-time HDR video. It may be desired, however, to "unwarp" the ring shaped view, e.g., for display on a screen for human observation. The processing system 113 includes a module to transform the ring-shaped view into a "standard" view.

Figure 6:
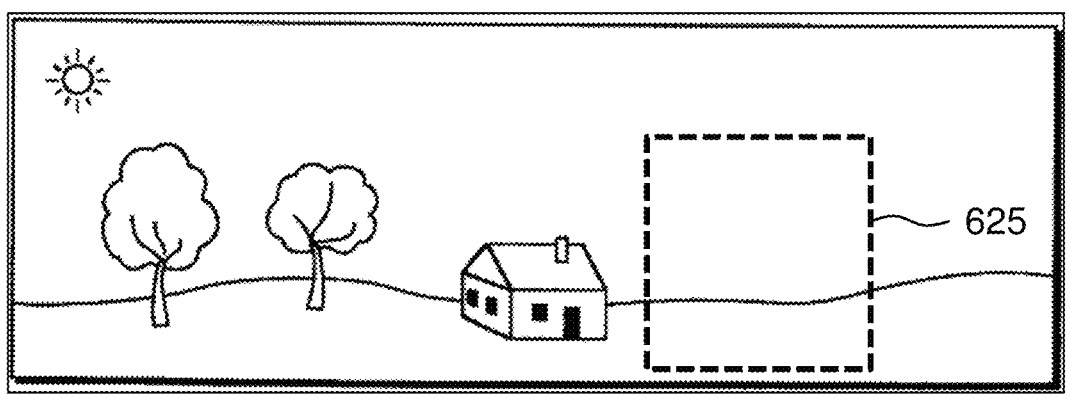
FIG. 6 illustrates a standard view corresponding to the ring-shaped view.

FIG. 6 illustrates a standard view corresponding to the ring-shaped view 601 after a de-warping process. A square area 625 is called out for visual comparison to the same square area called out within the ring-shaped view 601. For a given 360-degree camera 129, the transformation from the ring shaped view 601 into a standard view will generally be substantially consistent over the life of the camera. Accordingly, the processing system 113 may be programmed to include a simple transformation operation to transform the square area 625 as shown in FIG. 5 into that as shown in FIG. 6. Where a location of each pixel in the ring-shaped view 601 may be specified using x,y coordinates, a simple system of linear equations may transform those coordinates into the standard view as may be determined by one of skill in the art.

The processing system 113 may contribute to a variety of features and functionality that integrate the HDR camera with the ADAS.

In some embodiments of the vehicle 101, one or more components of the ADAS can operate to detect objects and determine a distance (or range of distances) to those objects. For example, the long range radar system 1407 may operate as a detection and ranging sensor 131, able to detect other vehicles in the roadway and a determine a range for those vehicles. The HDR camera 201 may be used to supplement or complement the information provided by the detection and ranging capabilities. For example, the processing system 113 may be operable to detect an object with the detection and ranging sensor, detect the object with HDR camera 201, and correlate an image of the object in the HDR video with a detected range of the object determined via the detection and ranging system.

As another example, the processing system 113 may be operable to detect glare in the environment within the 360-degree view and use the HDR camera 201 to capture an HDR image of a portion of the environment affected by the glare.

One benefit offered by the use of the HDR camera 201 is that such an instrument is particularly well-suited to making meaningful interpretations of scenes in which valuable information is provided primarily by a difference in light levels. As an example, a difference between a dark brake light and an illuminated brake light provides significant information to the operation of motor vehicles, but manifests primarily as a difference in light levels. Thus, in some embodiments, the HDR camera 201 is helpful in determining the appearance of an item such as a taillight, turn signal, or brake light on another vehicle and detecting an illumination status of the taillight.

Figure 7:
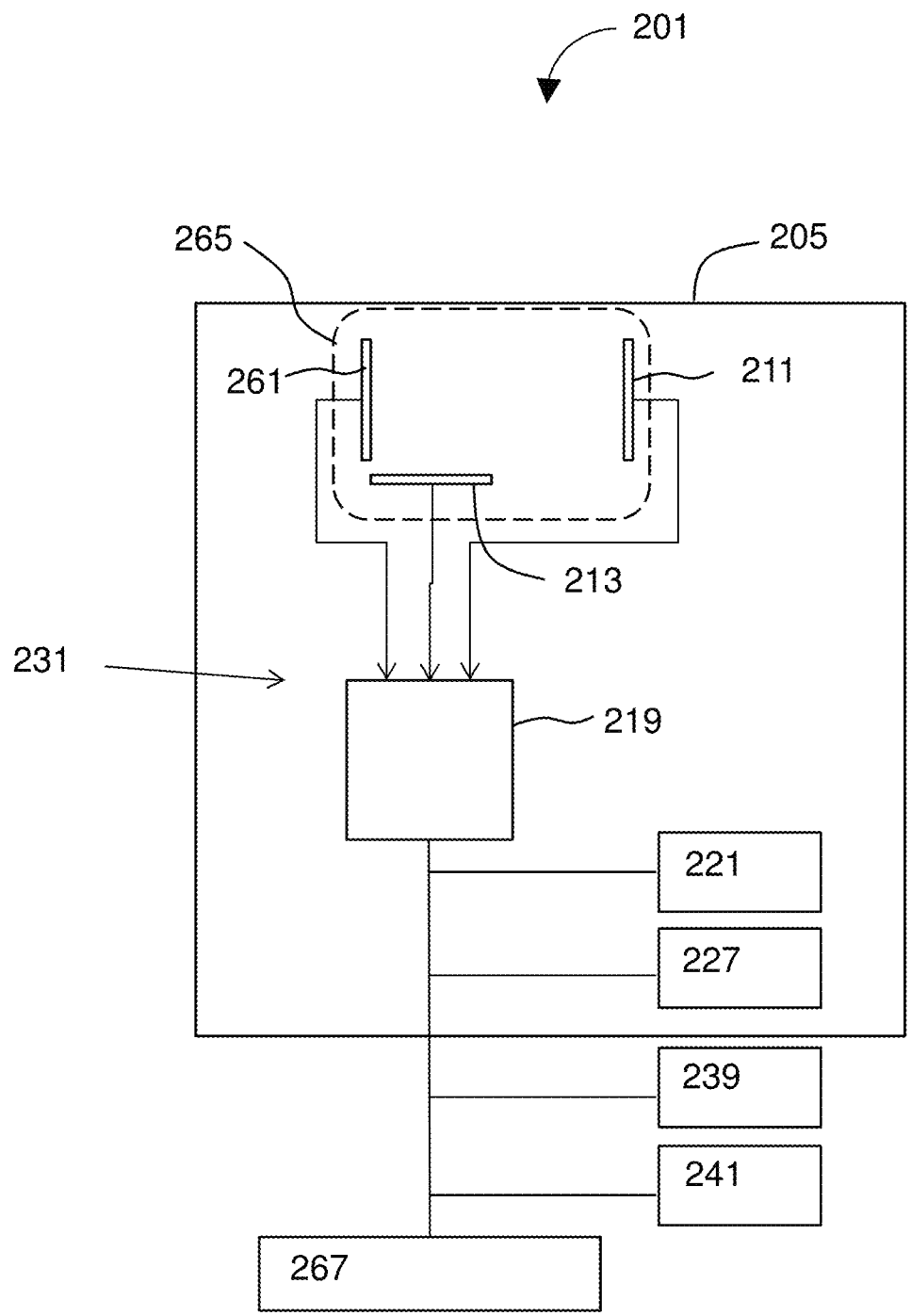
FIG. 7 shows a real-time HDR video camera according to certain embodiments.

At the core of the functionality offered by the system is the HDR camera 201 that operates to produce a real-time HDR video. The HDR camera 201 is connected to a control system 125 configured for operation of the vehicle through a processing system 113. In preferred embodiments, the HDR camera 201 comprises a plurality of image sensors coupled to a processing device, and the HDR camera 201 is configured to stream pixel values from each of the plurality of image sensors in a frame-independent manner through a pipeline on the processing device. The pipeline includes a kernel operation that identifies saturated pixel values and a merge module to merge the pixel values to produce the HDR video in real-time. The vehicle 101 may also include a 360-degree camera 129 that captures a 360-degree view around the vehicle FIG. 7 shows the HDR camera 201. The HDR camera 201 includes a processing device 219 such as a field-programmable gate array (FPGA) or an application-specific integrated circuit (ASIC). A plurality of image sensors 265 is coupled to the processing device 219. The HDR camera 201 is configured to stream pixel values 501 from each of the plurality of image sensors 265 in a frame independent-manner through a pipeline 231 on the processing device 219. The pipeline 231 includes a kernel operation 413 that identifies saturated pixel values 501 and a merge module to merge the pixel values 501 to produce an HDR image.

The kernel operation 413 operates on pixel values 501 as they stream from each of the plurality of image sensors 265 by examining, for a given pixel on the HE sensor 213, values from a neighborhood 601 of pixels surrounding the given pixel, finding saturated values in the neighborhood 601 of pixels, and using information from a corresponding neighborhood 601 on the ME sensor 211 to estimate a value for the given pixel.

Various components of the HDR camera 201 may be connected via a printed circuit board 205. The HDR camera 201 may also include memory 221 and optionally a processor 227 (such as a general-purpose processor like an ARM microcontroller). HDR camera 201 may further include or be connected to one or more of an input-output device 239 or a display 267. Memory can include RAM or ROM and preferably includes at least one tangible, non-transitory medium. The processor 227 may be any suitable processor known in the art, such as the processor sold under the trademark XEON E7 by Intel (Santa Clara, Calif.) or the processor sold under the trademark OPTERON 6200 by AMD (Sunnyvale, Calif.). Input/output devices according to the invention may include a video display unit (e.g., a liquid crystal display or LED display), keys, buttons, a signal generation device (e.g., a speaker, chime, or light), a touchscreen, an accelerometer, a microphone, a cellular radio frequency antenna, port for a memory card, and a network interface device, which can be, for example, a network interface card (NIC), Wi-Fi card, or cellular modem. The HDR camera 201 may include or be connected to a storage device 241. The plurality of sensors is preferably provided in an arrangement that allows multiple sensors 265 to simultaneously receive images that are identical except for light level.

Figure 8:
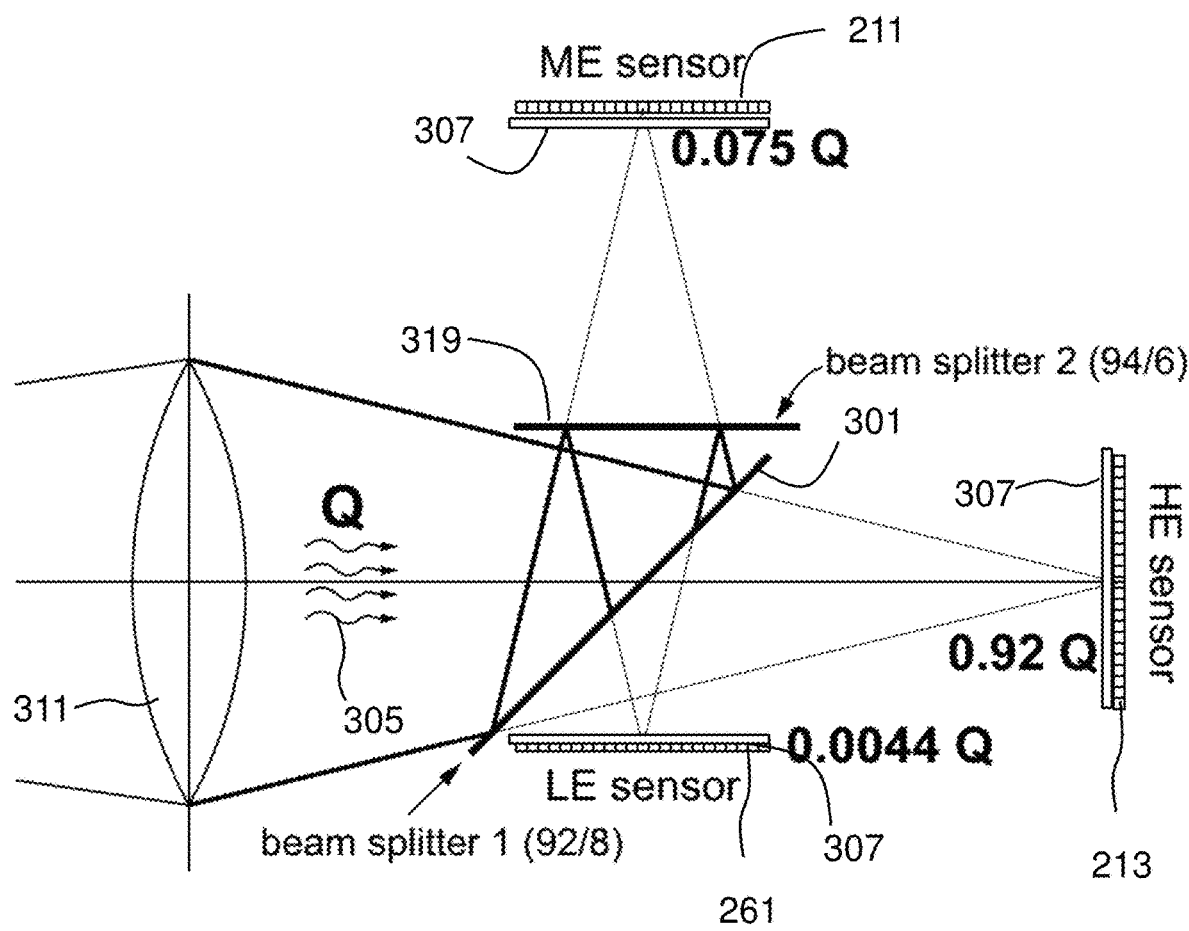
FIG. 8 shows an arrangement for multiple sensors in the HDR camera.

FIG. 8 shows an arrangement for the multiple sensors 265. The multiple sensors preferably include at least a high exposure (HE) sensor 213 and a middle exposure (ME) sensor 211. Each image sensor may have its own color filter array 307. The color filter arrays 307 may operate as a Bayer filter such that each pixel receives either red, green, or blue light. As is known in the art, a Bayer filter includes a repeating grid of red, green, blue, green filters such that a sequence of pixel values streaming from the sensor corresponds to values for red, green, and blue in a pre-determined pattern.

The HDR camera 201 may include a lens 311 and at least one beamsplitter 301. The HE sensor 213, the ME sensor 211, the lens 311 and the at least one beamsplitter 301 are arranged to receive an incoming beam of light 305 and split the beam of light 305 into at least a first path that impinges and HE sensor 213 and a second path that impinges on the ME sensor 211. In a preferred embodiment, the HDR camera 201 uses a set of partially-reflecting surfaces to split the light from a single photographic lens 311 so that it is focused onto three imaging sensors simultaneously. In a preferred embodiment, the light is directed back through one of the beamsplitters a second time, and the three sub-images are not split into red, green, and blue but instead are optically identical except for their light levels. This design, shown in FIG. 3, allows the vehicle 101 to capture HDR images using most of the light entering the camera.

In some embodiments, the optical splitting system uses two uncoated, 2-micron thick plastic beamsplitters that rely on Fresnel reflections at air/plastic interfaces so their actual transmittance/reflectance (T/R) values are a function of angle. Glass is also a suitable material option. In one embodiment, the first beamsplitter 301 is at a 45° angle and has an approximate T/R ratio of 92/8, which means that 92% of the light from the camera lens 311 is transmitted through the first beamsplitter 301 and focused directly onto the high-exposure (HE) sensor 213. The beamsplitter 301 reflects 8% of the light from the lens 311 upwards (as shown in FIG. 3), toward the second uncoated beamsplitter 319, which has the same optical properties as the first but is positioned at a 90. angle to the light path and has an approximate T/R ratio of 94/6. Of the 8% of the total light that is reflected upwards, 94% (or 7.52% of the total light) is transmitted through the second beamsplitter 319 and focused onto the medium-exposure (ME) sensor 211. The other 6% of this upward-reflected light (or 0.48% of the total light) is reflected back down by the second beamsplitter 319 toward the first beamsplitter 301 (which is again at 45°), through which 92% (or 0.44% of the total light) is transmitted and focused onto the low-exposure (LE) sensor 261. With this arrangement, the HE, ME and LE sensors capture images with 92%, 7.52%, and 0.44% of the total light gathered by the camera lens 311, respectively. Thus a total of 99.96% of the total light gathered by the camera lens 311 has been captured by the image sensors. Therefore, the HE and ME exposures are separated by 12.2× (3.61 stops) and the ME and LE are separated by 17.0× (4.09 stops), which means that this configuration is designed to extend the dynamic range of the sensor by 7.7 stops.

This beamsplitter arrangement makes the HDR camera 201 light efficient: a negligible 0.04% of the total light gathered by the lens 311 is wasted. It also allows all three sensors to "see" the same scene, so all three images are optically identical except for their light levels. Of course, in the apparatus of the depicted embodiment 201, the ME image has undergone an odd number of reflections and so it is flipped left-right compared to the other images, but this is fixed easily in software. In preferred embodiments, the three sensors independently stream incoming pixel values directly into a pipeline that includes a synchronization module. This synchronization module can correct small phase discrepancies in data arrival times to the system from multiple sensors.

Thus it can be seen that the beamsplitter 301 directs a majority of the light to the first path and a lesser amount of the light to the second path. Preferably, the first path and the second path impinge on the HE sensor 213 and the ME sensor 211, respectively, to generate images that are optically identical but for light level. In the depicted embodiment, the HDR camera 201 includes a low exposure (LE) sensor.

In preferred embodiments, pixel values stream from the HE sensor 213, the ME sensor 211, and the LE sensor 261 in sequences directly to the processing device 219. Those sequences may be not synchronized as they arrive onto the processing device 219.

The HDR camera 201 (1) captures optically-aligned, multiple- exposure images simultaneously that do not need image manipulation to account for motion, (2) extends the dynamic range of available image sensors (by over 7 photographic stops in one embodiment), (3) is inexpensive to implement, (4) utilizes a single, standard camera lens 311, and (5) efficiently uses the light from the lens 311. The HDR camera also optionally (1) combines images separated by more than 3 stops in exposure, (2) spatially blends pre-demosaiced pixel data to reduce unwanted artifacts, (3) produces HDR images that are radiometrically correct, and (4) uses the highest-fidelity (lowest quantized-noise) pixel data available.

Figure 9:
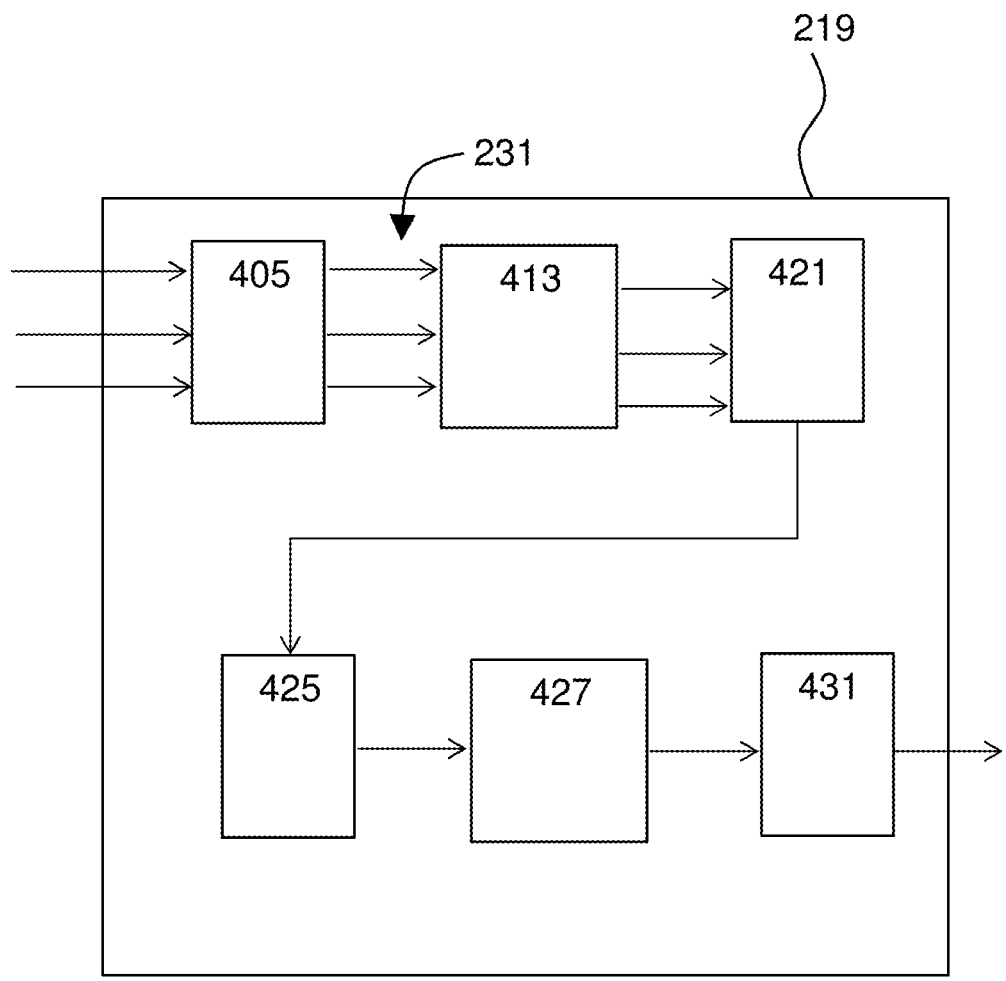
FIG. 9 shows a processing device on the HDR camera.

FIG. 9 shows the processing device 219 on the HDR camera 201. As noted, the processing device 219 may be provided by one or more FPGA, ASIC, or other integrated circuit. Pixel values from the sensors stream through the pipeline 231 on the processing device 219. The pipeline 231 in the processing device 219 includes—in the order in which the pixel values 501 flow: a sync module 405 to synchronize the pixel values 501 as the pixel values 501 stream onto the processing device 219 from the plurality of image sensors 265; the kernel operation 413; the merge module 421; a demosaicing module 425; and a tone-mapping operator 427. The pipeline 231 may include one or more auxiliary module 431 such as a color-correction module; an HDR conversion module; and an HDR compression module.

In operation, light enters the HDR camera 201 through a lens and meets one or more beamsplitters that split the light into different paths that impinge upon multiple image sensors. Each image sensor then captures a signal in the form of a pixel value for each pixel of the sensor. Each sensor includes an array of pixels. Any suitable size of pixel array may be included. In some embodiments, one or more of the sensors has 1920×1080 pixels. As light impinges on the sensor, pixel values stream off of the sensor to a connected processing device. The pixel values stream from each of multiple sensors in a frame independent-manner through a pipeline on a processing device 219. The pipeline 231 includes a kernel operation 135 that identifies saturated pixel values. The pixel values 501 are merged 139. Typically, the merged image will be demosaiced 145 and this produces an HDR image that can be displayed, transmitted, stored, or broadcast 151. In operation of the vehicle 101, the multiple image sensors all capture 125 images simultaneously through a single lens 311. The pipeline 231 and kernel operation 135 may be provided by an integrated circuit such as a field-programmable gate array or an application-specific integrated circuit. Each of the image sensors may include a color filter array 307. In preferred embodiments, the HDR image is demosaiced 145 after the merging step 139. The multiple image sensors preferably capture images that are optically identical except for light level.

A feature is that the pixel values 501 are pipeline processed in a frame-independent manner. Sequences of pixel values 501 are streamed 129 through the processing device 219 and merged 139 without waiting to receive pixel values 501 from all pixels on the image sensors. This means that the obtaining 125, streaming 129, and merging 139 steps may be performed by streaming 129 the sequences of pixel values 501 through the pipeline 231 on the processing device 219 such that no location on the processing device 219 stores a complete image. Because the pixel values are streamed through the pipeline, the final HDR video signal is produced in real-time. Real-time means that HDR video from the camera may be displayed essentially simultaneously as the camera captures the scene (e.g., at the speed that the signal travels from sensor to display minus a latency no greater than a frame of video). There is no requirement for post-processing the image data and no requirement to capture, store, compare, or process entire "frames" of images.

The output is an HDR video signal because the HDR camera 201 uses multiple sensors at different exposure levels to capture multiple isomorphic images (i.e., identical but for light level) and merge them. Data from a high exposure (HE) sensor are used where portions of an image are dim and data from a mid-exposure (ME) (or lower) sensor(s) are used where portions of an image are more brightly illuminated. The HDR camera 201 merges the HE and ME (and optionally LE) images to produce an HDR video signal. Specifically, the HDR camera 201 identifies saturated pixels in the images and replace those saturated pixels with values derived from sensors of a lower exposure. In preferred embodiments, a first pixel value from a first pixel on one of the image sensors is identified as saturated if it is above some specified level, for example at least 90% of a maximum possible pixel value.

Figure 10:
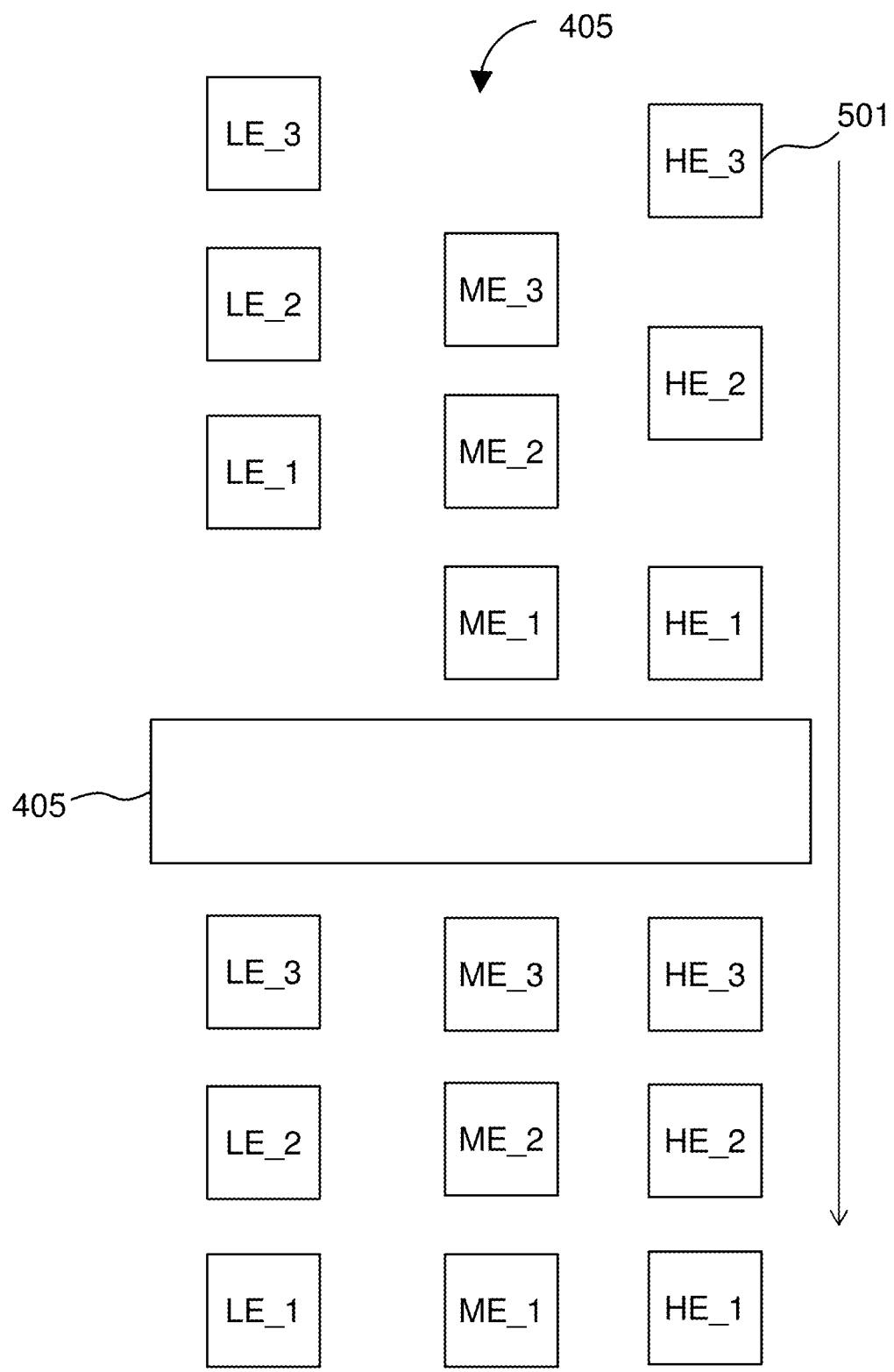
FIG. 10 shows operation of a sync module to synchronize pixel values.

FIG. 10 shows operation of the sync module 405 to synchronize the pixel values 501 as the pixel values 501 stream onto the processing device 219 from the plurality of image sensors 265. As depicted in FIG. 5, HE_1 pixel value and ME_1 pixel value are arriving at the sync module 405 approximately simultaneously. However, HE_2 pixel value will arrive late compared to ME_2, and the entire sequence of LE pixel values will arrive late. The sync module 405 can contain small line buffers that circulate the early-arriving pixel values and release them simultaneous with the corresponding later-arriving pixel values. The synchronized pixel values then stream through the pipeline 231 to the kernel operation 413.

Figure 11:
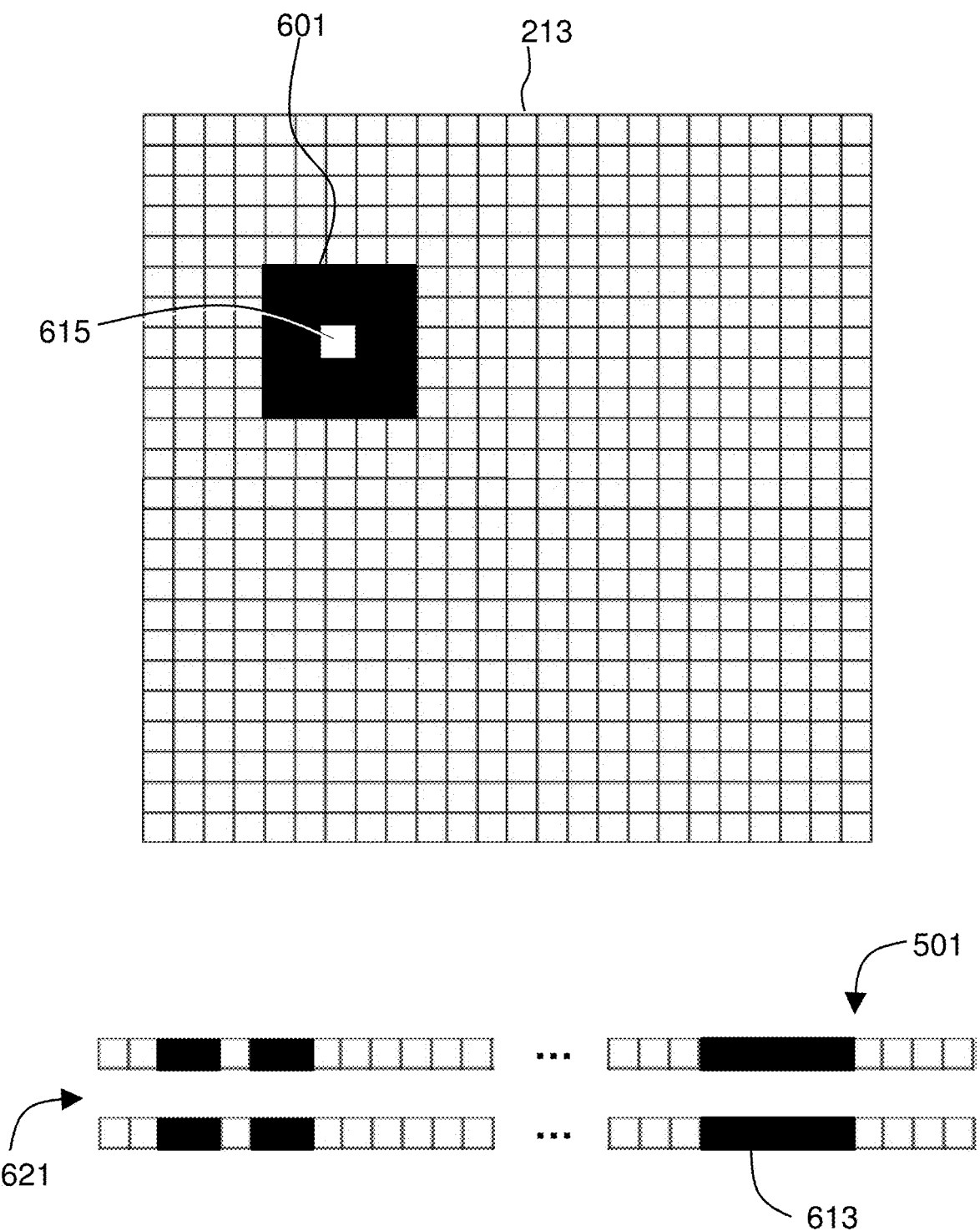
FIG. 11 illustrates pixel values presented to a kernel operation.

FIG. 11 illustrates how the pixel values are presented to the kernel operation 413. The top part of FIG. 11 depicts the HE sensor 213. Each square depicts one pixel of the sensor 213. A heavy black box with a white center is drawn to illustrate a given pixel 615 for consideration and a neighborhood 601 of pixels surrounding the given pixel 615. The heavy black box would not actually appear on a sensor 213 (such as a CMOS cinematic camera sensor)—it is merely drawn to illustrate what the neighborhood 601 includes and to aid understanding how the neighborhood 601 appears when the sequences 621 of pixel values 501 are presented to the kernel operation 413.

The bottom portion of FIG. 11 shows the sequences 621 of pixel values as they stream into the kernel operation 413 after the sync module 405. Pixel values 501 from the neighborhood 601 of pixels on the sensor 213 are still "blacked out" to aid illustration. The given pixel 615 under consideration can be spotted easily because it is surrounded on each side by two black pixels from the row of pixels on the sensor. There are two sequences 621, one of which comes from the depicted HE sensor 213 and one of which originates at the ME sensor 211.

Streaming the pixel values 501 through the kernel operation 413 includes examining values from a neighborhood 601 of pixels surrounding a first pixel 615 on the HE sensor 213, finding saturated values in the neighborhood 601 of pixels, and using information from a corresponding neighborhood 613 from the ME sensor 211 to estimate a value for the first pixel 615. This will be described in greater detail below. To accomplish this, the processing device must make comparisons between corresponding pixel values from different sensors. It may be useful to stream the pixel values through the kernel operation in a fashion that places the pixel under consideration 615 adjacent to each pixel from the neighborhood 601 as well as adjacent to each pixel from the corresponding neighborhood on another sensor.

Figure 12:
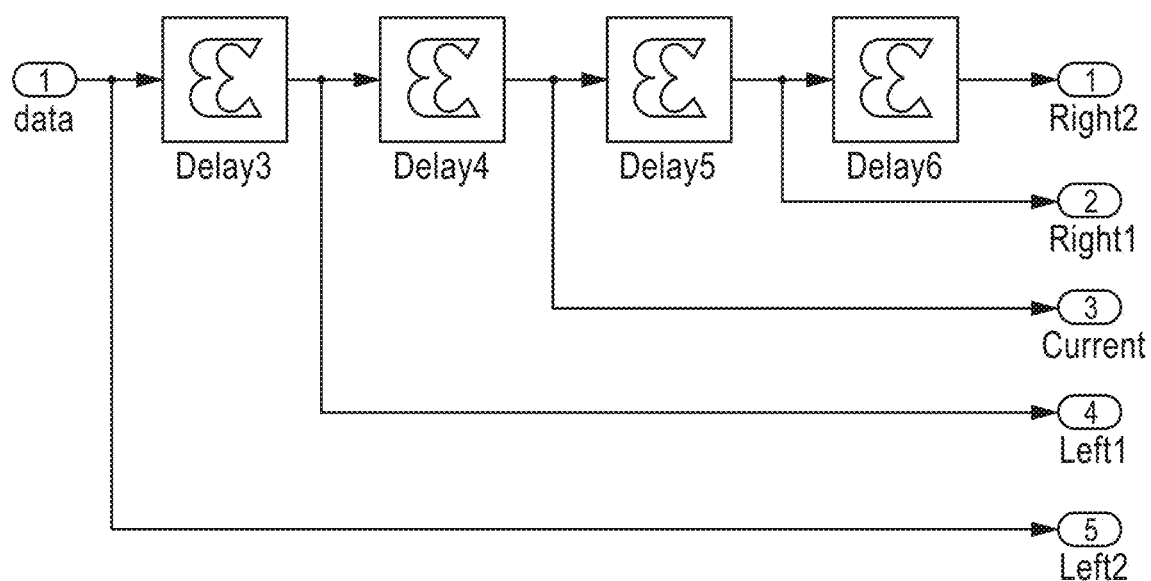
FIG. 12 shows a circuit model that places a current pixel adjacent to its neighbors.

FIG. 12 shows an approach to modeling the circuit so that the pipeline places the current pixel 615 adjacent to each of the following pixel values: a pixel value from 1 to the right on the sensor 213, a pixel value from 2 pixels to the right on sensor 213, a pixel value from 1 to the left, and pixel value from two to the left. As shown in FIG. 12, data flows into this portion of the pipeline and is copied four additional times. For each copy, a different and specific amount of delay is added to the main branch. The five copies all continue to flow in parallel. Thus, a simultaneous snapshot across all five copies covers the given current pixel value 615 and the other pixel values from the neighborhood 601. In this way, pixel values on either side of the pixel currently being processed can be used in that processing step, along with the pixel currently being processed. Thus the processing device can simultaneously read and compare the pixel value of the given pixel to the value of neighbors. The approach illustrated in FIG. 12 can be extended for comparisons to upper and lower neighbors, diagonal neighbors, and pixel values from a corresponding neighborhood on another sensor. Thus in some embodiments, streaming 129 the pixel values 501 through the kernel operation 413 includes streaming 129 the pixel values 501 through a path 621 within the processing device 219 that momentarily places a value from the first pixel proximal to each value originating from the neighborhood 601 of pixels.

The neighborhood comparisons may be used in determining whether to use a replacement value for a saturated pixel and what replacement value to use. An approach to using the neighborhood comparisons is discussed further down after a discussion of the merging. A replacement value will be used when the sequences 621 of pixel values 501 are merged 139 by the merge module 421. The merging 139 step excludes at least some of the saturated pixel values 501 from the HDR image.

Previous algorithms for merging HDR images from a set of LDR images with different exposures typically do so after demosaicing the LDR images and merge data pixel-by-pixel without taking neighboring pixel information into account.

To capture the widest dynamic range possible with the smallest number of camera sensors, it is preferable to position the LDR images further apart in exposure than with traditional HDR acquisition methods. Prior art methods yield undesired artifacts because of quantization and noise effects, and those problems are exacerbated when certain tone mapping operators (TMOs) are applied. Those TMOs amplify small gradient differences in the image to make them visible when the dynamic range is compressed, amplifying merging artifacts as well.

Figure 13:
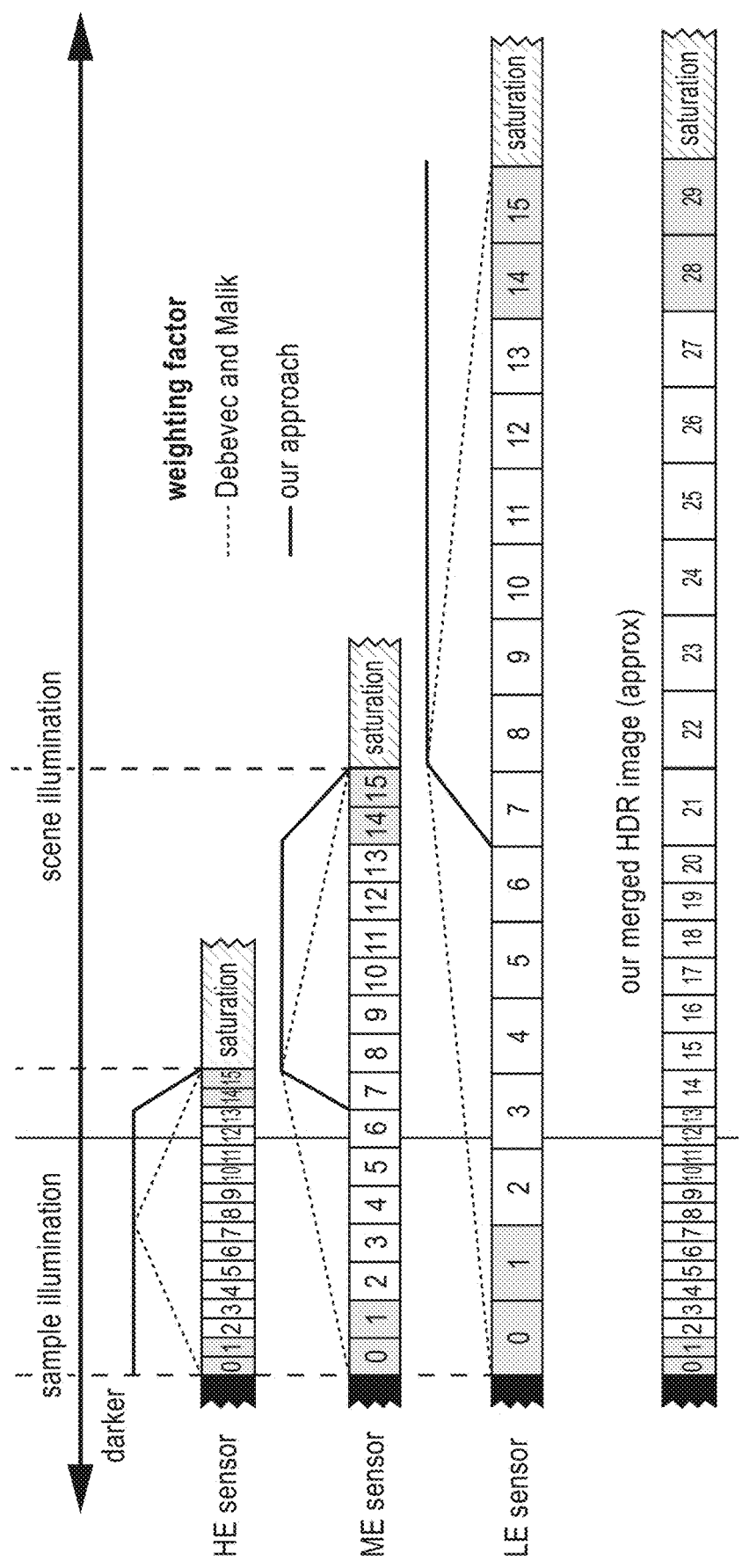
FIG. 13 illustrates an approach to merging.

FIG. 13 illustrates an approach to merging that reduces artifacts (e.g., compared to the weighting factor used in a merging algorithm in Debevec and Malik, 1997, Recovering high dynamic range radiance maps from photographs, Proceedings of ACM SIGGRAPH 1997:369-378, incorporated by reference). The "HE sensor", "ME sensor", and "LE sensor" bars in FIG. 8 present the range of scene illumination measured by the three sensors For illustration, the system is simplified with 4-bit sensors (as opposed to the 12-bit sensors as may be used in HDR camera 201), which measure only 16 unique brightness values and the sensors are separated by only 1 stop (a factor of 2) in exposure. Since CMOS sensors exhibit an approximately linear relationship between incident exposure and their output value, the values from the three sensors are graphed as a linear function of incident irradiance instead of the traditional logarithmic scale.

Merging images by prior art algorithms that always use data from all three sensors with simple weighting functions, such as that of Debevec and Malik, introduces artifacts. In the prior art, data from each sensor is weighted with a triangle function as shown by the dotted lines, so there are non-zero contributions from the LE sensor at low brightness values (like the sample illumination level indicated), even though the data from the LE sensor is quantized more coarsely than that of the HE sensor.

Methods of the invention, in contrast, use data from the higher-exposure sensor as much as possible and blend in data from the next darker sensor when near saturation.

FIG. 13 shows that the LE sensor measures the scene irradiance more coarsely than the other two sensors. For example, the HE sensor may measure 4 different pixel values in a gradient before the LE sensor records a single increment. In addition, there is always some small amount of noise in the pixel values, and an error of ±1 in the LE sensor spans a 12 value range in the HE sensor for this example. Although Debevec and Malik's algorithm blends these values together, the HDR camera 201 uses pixel values from only the longest-exposure sensor (which is less noisy) wherever possible, and blend in the next darker exposure when pixels approach saturation.

In certain embodiments, the HDR camera 201 not only examines individual pixels when merging the LDR images, but also takes into account neighboring pixels 601 (see FIG. 11) that might provide additional information to help in the de-noising process.

One aspect of merging 139 according to the invention is to use pixel data exclusively from the brightest, most well-exposed sensor possible. Therefore, pixels from the HE image are used as much as possible, and pixels in the ME image are only used if the HE pixel is close to saturation. If the corresponding ME pixel is below the saturation level, it is multiplied by a factor that adjusts it in relation to the HE pixel based on the camera's response curve, given that the ME pixel receives 12.2× less irradiance than the HE pixel.

Figure 14:
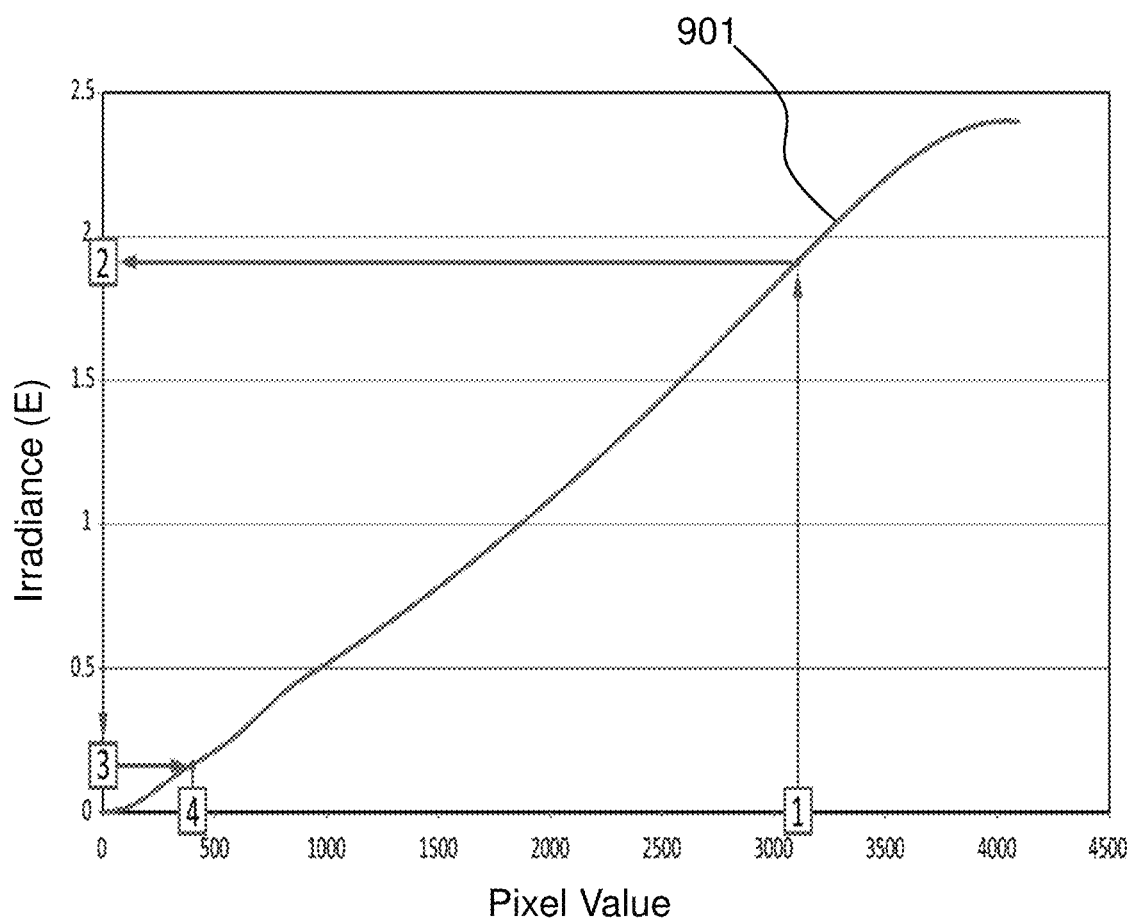
FIG. 14 shows a camera response curve.

FIG. 14 shows a camera response curve 901 used to obtain a factor for adjusting a pixel value. In a three-sensor embodiment, when the HE sensor is above the saturation level, and if the corresponding ME pixel is above the saturation level, then a similar process is applied to the same pixel in the low-exposure LE image.

It may be found that merging by a "winner take all" approach that exclusively uses the values from the HE sensor until they become saturated and then simply switches to the next sensor results in banding artifacts where transitions occur. To avoid such banding artifacts, the HDR camera 201 optionally transitions from one sensor to the next by spatially blending pixel values between the two sensors. To do this, the HDR camera 201 scans a neighborhood 601 around the pixel 615 being evaluated (see FIG. 6). If any neighboring pixels in this region are saturated, then the pixel under consideration may be subject to pixel crosstalk or leakage, and the HDR camera 201 will estimate a value for the pixel based on its neighbors in the neighborhood 601.

The HDR camera 201 performs merging 139 prior to demosaicing 145 the individual Bayer color filter array images because demosaicing can corrupt colors in saturated regions. For example, a bright orange section of a scene might have red pixels that are saturated while the green and blue pixels are not. If the image is demosaiced before being merged into HDR, the demosaiced orange color will be computed from saturated red-pixel data and non-saturated green/blue-pixel data. As a result, the hue of the orange section will be incorrectly reproduced. To avoid these artifacts, the HDR camera 201 performs HDR-merging prior to demosaicing.

Since the images are merged prior to the demosaicing step, the HDR camera 201 preferably works with pixel values instead of irradiance. To produce a radiometrically-correct HDR image, the HDR camera 201 matches the irradiance levels of the HE, ME, and LE sensors using the appropriate beamsplitter transmittance values for each pixel color, since these change slightly as a function of wavelength. Although the HDR camera 201 uses different values to match each of the color channels, for simplicity the process is explained with average values. A pixel value is converted through the camera response curve 901, where the resulting irradiance is adjusted by the exposure level ratio (average of 12.2× for HE/ME), and this new irradiance value is converted back through the camera response curve 901 to a new pixel value.

FIG. 14 shows the 3-step HDR conversion process to match the irradiance levels of the HE, ME, and LE sensors. The HDR conversion process may be done for all HE pixel values (from 1 through 4096, for example), to arrive at a pixel-ratio curve, which gives the scaling factor for converting each ME pixel's value to the corresponding pixel value on the HE sensor for the same irradiance. In practice, separate pixel-ratio curves are calculated for each color (R,G,B) in the Bayer pattern. When comparing pixel values between HE and ME images (or between ME and LE images), a simple multiplier may be used, or the pixel-ratio curves may be used as lookup tables (LUTs), to convert HE pixel values less than 4096 into ME pixel values, or vice versa. When the HE pixel values are saturated, the pixel-ratio curve is extended using the last value obtained there (approximately 8).

The camera response curve 901 can be measured by taking a set of bracketed exposures and solving for a monotonically-increasing function that relates exposure to pixel value (to within a scale constant in the linear domain). The curve may be computed from the raw camera data, although a curve computed from a linear best-fit could also be used. A camera response curve shows how the camera converts scene irradiance into pixel values. To compute what the ME pixel value should be for a given HE value, the HE pixel value (1) is first converted to a scene irradiance (2), which is next divided by our HE/ME attenuation ratio of 12.2. This new irradiance value (3) is converted through the camera response curve into the expected ME pixel value (4). Although this graph is approximately linear, it is not perfectly so because it is computed from the raw data, without significant smoothing or applying a linear fit. With the irradiance levels of the three images matched, the merging 139 may be performed.

In an illustrative example of merging 139, two registered LDR images (one high-exposure image IHE and a second medium-exposure image IME) are to be merged 139 into an HDR image IHDR. The merging 139 starts with the information in the high-exposure image IHE and then combines in data from the next darker-exposure image IME, as needed. To reduce the transition artifacts described earlier, the HDR camera 201 works on each pixel location (x, y) by looking at the information from the surrounding (2k+1)× (2k+1) pixel neighborhood 601, denoted as N(x,y).

In some embodiments as illustrated in FIG. 11, the HDR camera 201 uses a 5×5 pixel neighborhood 601 (k=2), and defines a pixel to be saturated if its value is greater than some specific amount, for example 90% of the maximum pixel value (4096 e.g., where sensor 213 is a 12-bit CMOS sensor).

In certain embodiments, the merging 139 includes a specific operation for each of the four cases for the pixel 615 on sensor 213 and its neighborhood 601 (see FIG. 6):

Case 1: The pixel 615 is not saturated and the neighborhood 601 has no saturated pixels, so the pixel value is used as-is.

Case 2: The pixel 615 is not saturated, but the neighborhood 601 has 1 or more saturated pixels, so blend between the pixel value at IHE(x, y) and the one at the next darker-exposure IME(x, y) depending on the amount of saturation present in the neighborhood.

Case 3: The pixel 615 is saturated but the neighborhood 601 has 1 or more non-saturated pixels, which can be used to better estimate a value for IHE(x,y): calculate the ratios of pixel values in the ME image between the unsaturated pixels in the neighborhood and the center pixel, and use this map of ME ratios to estimate the actual value of the saturated pixel under consideration.

Case 4: The pixel 615 is saturated and all pixels in the neighborhood 601 are saturated, so there is no valid information from the high- exposure image, use the ME image and set IHDR(x, y)=IME(x, y).

When there are three LDR images, the process above is simply repeated in a second iteration, substituting IHDR for IHE and ILE for IME. In this manner, data is merged 139 from the higher exposures while working toward the lowest exposure, and data is only used from lower exposures when the higher-exposure data is at or near saturation.

This produces an HDR image that can be demosaiced 145 and converted from pixel values to irradiance using a camera response curve similar to that of FIG. 9 accounting for all 3 color channels. The final HDR full-color image may then be tone mapped (e.g., with commercial software packages such as FDRTools, HDR Expose, Photomatix, etc.)

The HDR camera 201 may be implemented using three Silicon Imaging SI-1920HD high-end cinema CMOS sensors mounted in a camera body. Those sensors have 1920× 1080 pixels (5 microns square) with a standard Bayer color filter array, and can measure a dynamic range of around 10 stops (excluding noise). The sensors are aligned by aiming the camera at small pinhole light sources, locking down the HE sensor and then adjusting setscrews to align the ME and LE sensors.

The camera body may include a Hasselblad lens mount to allow the use of high-performance, interchangeable commercial lenses. For beamsplitters, the apparatus may include uncoated pellicle beamsplitters, such as the ones sold by Edmund Optics [part number NT39-482]. Preferably, the multiple image sensors include at least a high exposure (HE) sensor 213 and a middle exposure (ME) sensor 211, and the merging includes using HE pixel values 501 that are not saturated and ME pixel values 501 corresponding to the saturated pixel values. The multiple sensors may further include a low exposure (LE) sensor 261, and the kernel operation may identify saturated pixel values 501 originating from both the HE sensor 213 and the ME sensor 211. Because the pixel values stream through a pipeline, it is possible that at least some of the saturated pixel values 501 are identified before receiving values from all pixels of the multiple image sensors at the processing device 219 and the merge operation may begin to merge 139 portions of the sequences while still streaming 129 later-arriving pixel values 501 through the kernel operation 413.

It is understood that optical components such as beamsplitters, lenses, or filters—even if labeled "spectrally neutral"—may have slight wavelength-dependent differences in the amounts of light transmitted. That is, each image sensor may be said to have its own "color correction space" whereby images from that sensor need to be corrected out of that color correction space to true color. The optical system can be calibrated (e.g., by taking a picture of a calibration card) and a color correction matrix can be stored for each image sensor. The HDR video pipeline can then perform the counter-intuitive step of adjusting the pixel values from one sensor towards the color correction of another sensor— which may in some cases involve nudging the colors away from true color. This may be accomplished by multiplying a vector of RGB values from the one sensor by the inverse color correction matrix of the other sensor. After this color correction to the second sensor, the streams are merged, and the resulting HDR video signal is color corrected to truth (e.g., by multiplying the RGB vectors by the applicable color correction matrix). This color correction process accounts for spectral differences of each image sensor.

Figure 15:
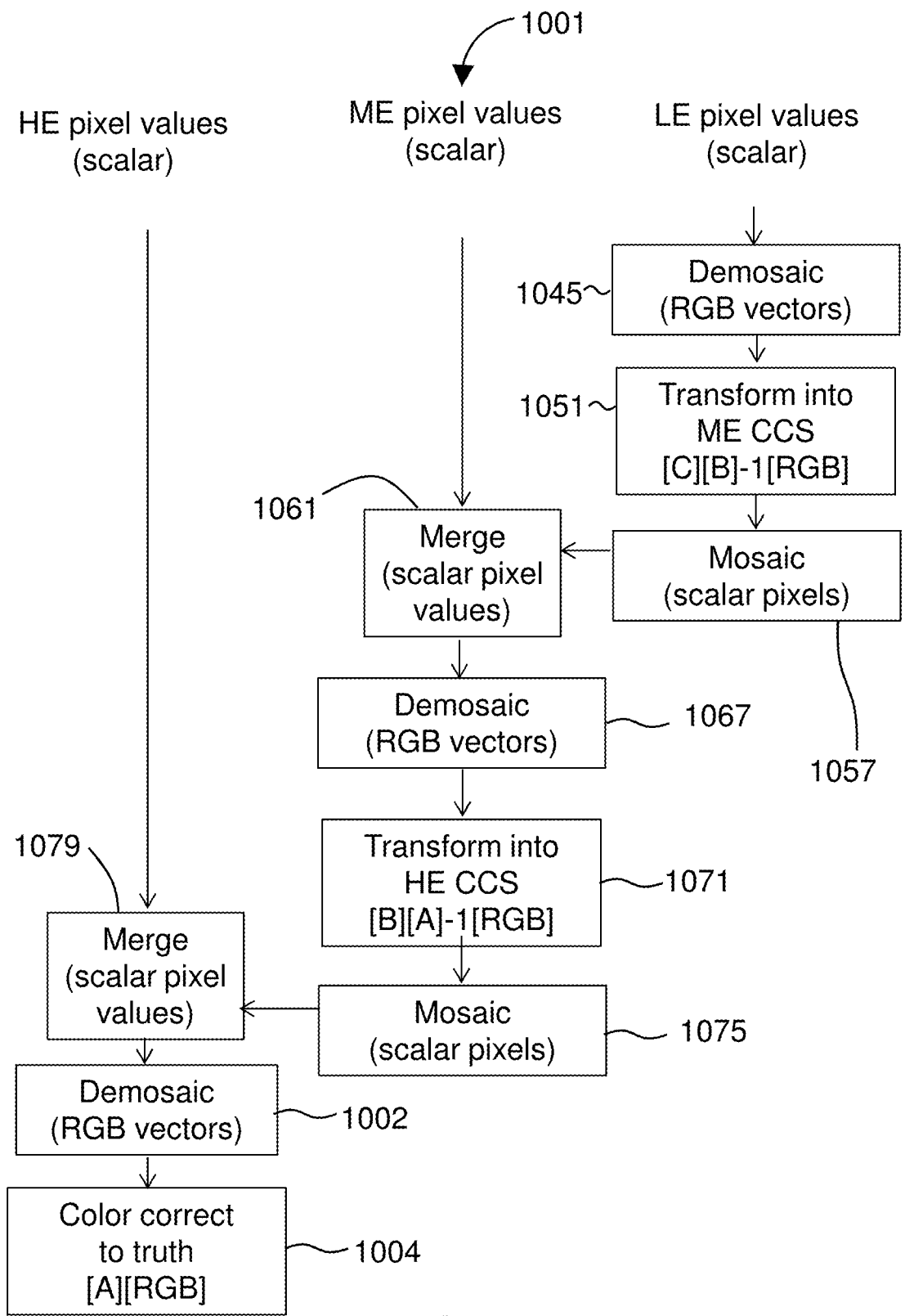
FIG. 15 diagrams a color correction processes.

FIG. 15 shows a color correction processes 1001 by which the HDR pipeline can correct for differences in spectral characteristics of each of the multiple sensors. To correct for the slight wavelength-dependent differences among the sensors, relationships between electron input and electron output can be measured experimentally using known inputs. By computing a correction factor for each sensor, the information detected by the sensors can be corrected prior to further processing. Thus, in some embodiments, the pipeline 231 includes modules for color correction. The steps of a color correction process may be applied at multiple locations along the pipeline, so the color correction may be implemented via specific modules at different locations on the FPGA. Taken together, those modules may be referred to as a color correction module that implements the color correction process 1001.

The color correction process 1001 converts one sensor's data from its color correction space to the color correction space of another sensor, before merging the images from the two sensors. The merged image data can then be converted to the color correction space of a third sensor, before being combined with the image data from that third sensor. The process may be repeated for as many sensors as desired. After all sensors' images have been combined, the final combined image may be demosaiced 145 and then may be color corrected to truth.

The color correction process 1001 allows images from multiple sensors to be merged, in stages where two images are merged at a time, in a way that preserves color information from one sensor to the next. For example purposes, in FIG. 15, the HE pixel values from the HE sensor are merged with the ME pixel values from the ME sensor. The result of merging is then merged with the LE pixel values from the LE sensor.

The basic principle guiding the color correction process 1001 is to first convert a dark image to the color correction space of the next brightest image, and then to merge the two "non-demosaiced" (or Color Filter Array [CFA] Bayer-patterned) images together.

The color correction process 1001, for an HDR camera 201 with an ME sensor, an LE sensor, and an SE sensor, includes three general phases: an SE color correction space (CCS) phase, ME color correction space phase, and LE color correction space phase. The color correction process first begins with the SE color correction space phase, which comprises first demosaicing 1045 the LE pixel values and then transforming 1051 the resulting vectors into the color correction space of the ME image. The demosaicing process 1045 yields a full-color RGB vector value for each pixel.

After it has been demosaiced 1045, the LE image data is next transformed 1045 into the ME color correction space. The purpose is to match the color of the LE pixels (now described by RGB vectors) to the color of the ME array (with all of the ME array's color imperfections). To perform the transformation 1051, the LE RGB vectors are transformed 1051 by a color correction matrix. For example, Equations 1-3 show how to use the color correction matrices to correct the color values for the HE, ME, and LE sensors, respectively. Equation 1 shows how to use the color correction matrix to correct the color values of the HE sensor, where the 3×3 matrix coefficients, including values A1-A9, represent coefficients selected to strengthen or weaken the pixel value, and an RGB matrix (RLE, GLE, and BLE) represents the demosaiced RGB output signal from the LE sensor. In some cases, the 3×3 matrix coefficients can be derived by comparing the demosaiced output against expected (or so-called "truth") values. For example, the 3×3 matrix coefficients can be derived by least-squares polynomial modeling between the demosaiced RGB output values and reference values from a reference color chart (e.g., a Macbeth chart). Similarly, Equation 2 shows how to use the color correction matrix to correct the color values of the ME sensor, where the RGB matrix (RME, GME, and BME) represents the demosaiced RGB output signal from the ME sensor, and Equation 3 shows how to use the color correction matrix to correct the color values of the SE sensor, where the RGB matrix (RME, GME, and BME) represents the demosaiced RGB output values from the SE sensor.

Equation 1—correcting SE pixel values using [A], the Color Correction Matrix for the LE sensor Equation 2—correcting ME pixel values using [B], the Color Correction Matrix for the ME sensor Equation 3—correcting SE pixel values using [C], the Color Correction Matrix for the SE sensor To convert an image from a first color correction space (CCS) to a second color correction space, the color correction matrices from one or more sensors can be used. This process may be referred to as converting between color correction spaces or calibrating color correction spaces. Neither the first color correction space nor the second color correction space accurately reflects the true color of the captured image. The first and the second color correction space both have inaccuracies, and those inaccuracies are, in general, different from one another. Thus RGB values from each sensor must be multiplied by a unique color correction matrix for those RGB values to appear as true colors.

The present invention includes a method for converting an image from the LE sensor's color correction space to the ME sensor's color correction space and is illustrated in Equation 4 below:

Equation 4—converting LE pixel values from LE color correction space to ME color correction space In Equation 4, the LE sensor's pixel values (R, G, B) are multiplied by the LE sensor's correction. matrix, [C], and then multiplied by the inverse of the ME sensor's correction matrix, [B]. The result is a set of pixel values (R, G, B) that are in the ME sensor's color correction space.

Methods of the invention allow matching of the color correction space of the second sensor to the color correction space of the first sensor so that the images from the two sensors may be accurately combined, or merged. The method for applying all the inaccuracies of the second color correction space to the first color correction space, prior to combining images from the two into an HDR image, is previously unknown. Typical methods for combining data from multiple CFA sensors rely on color-correcting each sensor's data to the "truth" values measured from a calibrated color card, prior to combining the images. This is problematic in an HDR system, where it is known that the brighter sensor's image will have significant portions that are saturated, which saturated portions should actually have been utilized from the darker sensor's image when combining. Color correcting an image that has color information based on saturated pixels will cause colors to be misidentified. Therefore, in an HDR system, color-correcting the brighter image (for example, to "truth" color values), prior to combining images, will lead to colors being misidentified because of the use of saturated pixel data in creating colors from a mosaic-patterned image. For this reason, we specify that (1) the darker image have its color information transformed to match the color space of the brighter image, (2) this transformed darker image be combined with the brighter image, and then (3) the final combined image be color-transformed to "truth" color values.

The solution provided in the present invention avoids this saturated-pixel color misidentification problem by performing the steps of [(a) demosaic 1045, (b) color correct 1051 & (c) mosaic 1057] data from the darker sensor, thereby ensuring all data is accurately returned to its non-demosaiced state prior to the step of merging the darker sensor's data with the brighter sensor's data.

Furthermore, prior to merging the images from two sensors, the present invention matches the color correction spaces of the two sensors. This transformation ensures that the two images (from the first and second color correction space sensors) can be accurately merged, pixel-for-pixel, in non-demosaiced format, it may at first seem counterintuitive to change the color correction space of one sensor to match the color correction space of a second sensor, especially when the second sensor's color correction space is known to differ from the "true" color correction space. However, it is an important feature in ensuring that (1) the brighter sensor's color information not be demosaiced prior to merging, and (2) the color data from both sensors is matched together, prior to merging the images. The color correction process 1001 uses matrices that may themselves be implemented as kernels in the pipeline 231 on the processing device 219. Thus the color correction process 1001 is compatible with an UDR. pipeline workflow because the kernels are applied as they receive the pixel values.

After the LE information is transformed 1051 from the LE color correction space to the ME color correction space, the transformed values are mosaiced 1057 (i.e., the demosaicing process is reversed). The transformed scalar pixel values are now comparable with the Bayer-patterned scalar ME pixel values detected by the ME sensor, and the process 1001 includes merging 1061 of ME and HE non-demosaiced (i.e., scalar) sensor data.

The merged non-demosaiced image within the ME color correction space is then demosaiced 1067. This demosaicing 1064 is similar to the demosaicing 1045 described above, except the CFA pixel values undergoing the demosaicing process are now associated with the ME color correction space. The demosaicing 1067 produces RGB vectors in the ME color space. Those RGB vectors are transformed 1071 into the HE color space while also being color corrected ([B][A]−1[RGB]). Equation 2 shows how to use the color correction matrix to correct the color values of the ME sensor. The color corrected ME information is transformed 1071 from the ME color correction space to the HE color correction space by multiplying the ME color correction matrix by the inverse of the SE color correction matrix.

After the ME information is transformed 1071 from the ME color correction space to the HE color correction space, the transformed vectors are mosaiced 1075 (i.e., the demosaicing process is reversed). This allows the transformed ME CFA Bayer-patterned pixel values to merge 1079 with the HE pixel values detected by the HE sensor. At this point in the color correction process 1001, the transformed color information detected by the HE and ME sensors is now calibrated to match the color information detected by the HE sensor. This newly merged. color value data set now represents color values within the HE color correction space 205.

After the color processing and tone-mapping, the pipeline has produced an HDR video signal.

Figure 16:
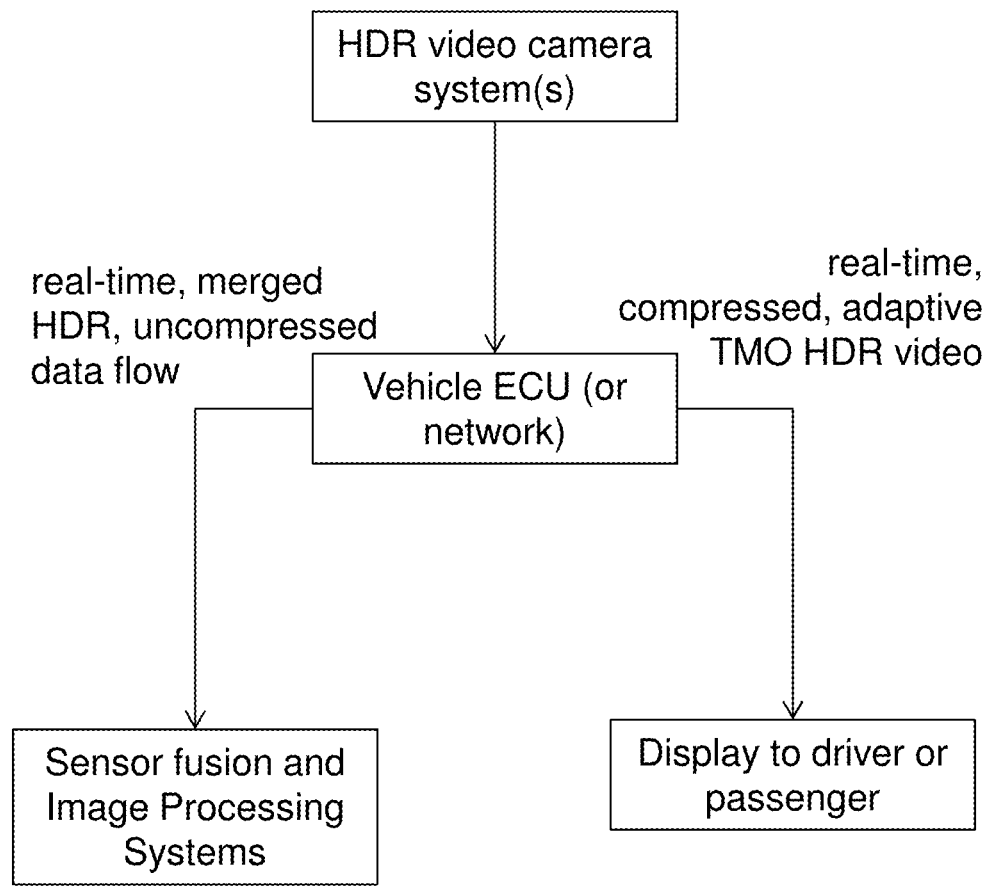
FIG. 16 diagrams an information flow that may be included in the vehicle.

FIG. 16 diagrams an information flow that may be included in the vehicle 101. The HDR video may be sent as fused, uncompressed data to the processing system 113. This may be accomplished using a vehicle ECU, an information network, or both. The processing system 113 or the camera 201 may include a tone-mapping operator 427. Tone-mapping converts the HDR video to "standard dynamic range" (SDR), suitable for display on standard screens. The real-time, tone-mapped signal may be displayed to a driver or passenger in the vehicle 101 (e.g., on a dashboard screen, screen on a wireless personal device, or via a heads-up display (HUD)).

One or more of the HDR camera 201 can be used in conjunction with single lens systems that can simultaneously, and without the need for stitching multiple cameras' views together, view 360 degrees in real-time. HDR is preferred for 360 degree simultaneous viewing because it is common to have the sun or other bright source in the field. HDR's extended light range capabilities ensure that the scene is visible from the darkest shadows to the brightest-lit areas. The processing system 113 can perform 360° unwrapping and unwarping in real-time for data subsets that may be relevant for sensor fusion and radar/lidar hand-off. Additionally or alternatively, a portion of the 360° view may be presented to driver or passenger for basic display purposes (unlike radar). This sensor can easily be calibrated with respect to direction and heading of the car to provide unique location and/or bearing data.

In some embodiments, the pipeline may include a module for subtraction that, in real-time, subtracts the SDR signal from the HDR signal (HDR-SDR=residual). What flows from the subtraction module is a pair of streams—the SDR video signal and the residual signal. Preferably, all of the color information is in the SDR signal. At this stage the HDR signal may be subject to HDR compression by a suitable operation (e.g., JPEG or similar). The pair of streams includes the 8-bit SDR signal and the compressed HDR residual signal, which provides for HDR display.

Figure 17:
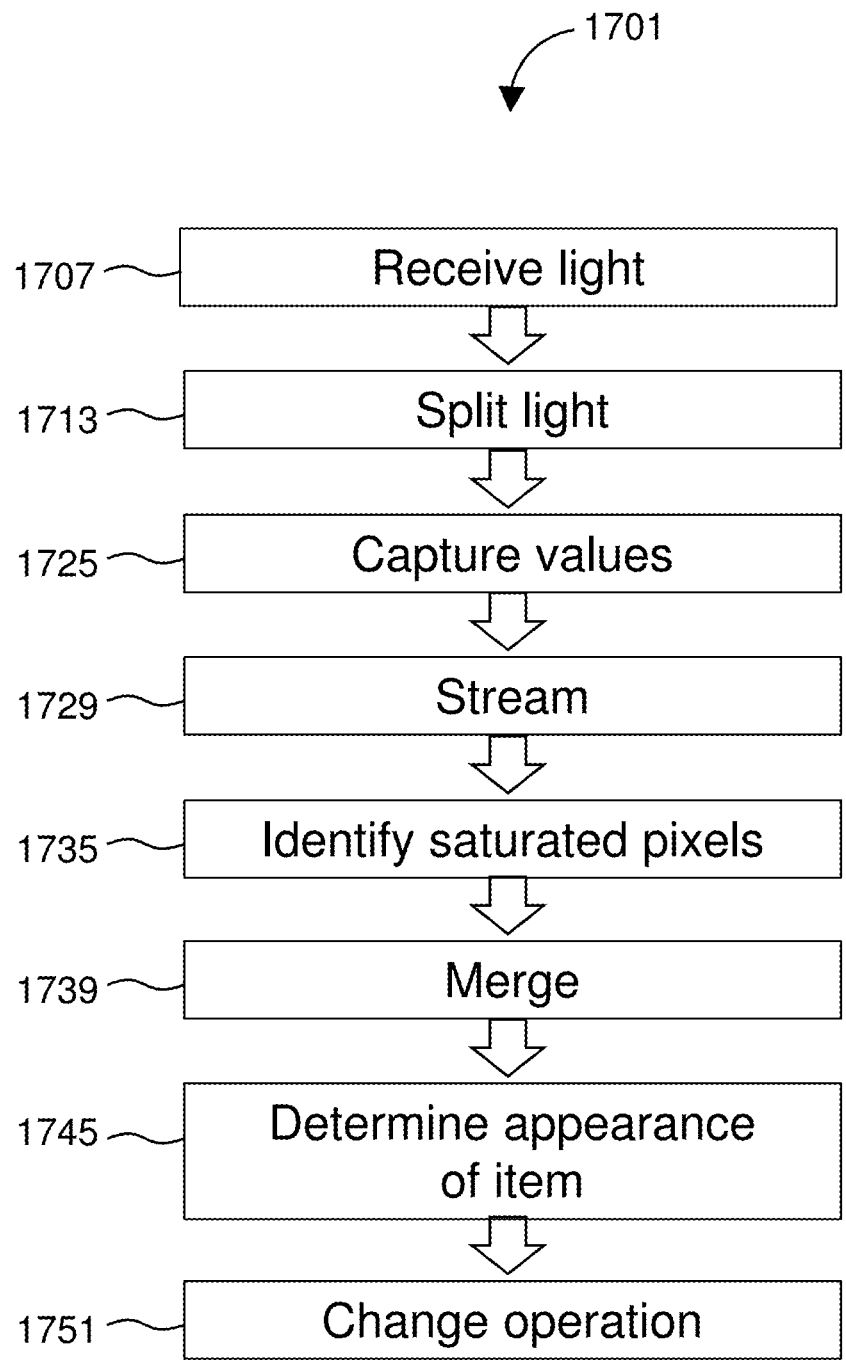
FIG. 17 diagrams steps of a method for operating a vehicle.

FIG. 17 diagrams steps of a method 1701 for operating a vehicle. The method 1701 includes the steps of receiving 1707 light via an HDR camera 201 on a vehicle 101. The beamsplitter 301 splits 1713 the light onto a plurality of image sensors 265 that capture 1725 values for each of a plurality of pixels on the sensors.

The pixel values are streamed 1729 to the processing device 219 that uses a kernel operation to identify 1735 saturated pixel values and a merge module to merge 1739 the pixel values to produce the HDR video in real-time. The video is preferably demosaiced. The processing system 113 determines 1745 based, on the HDR video, an appearance of an item in an environment of the vehicle 101 and causes the control system to make a change 1751 in the operation of the vehicle 101 based on the appearance of the item. The vehicle is preferably an autonomous vehicle.

Determining 1745 the appearance of an item in an environment of the vehicle 101 may cause the control system to make a change 1751 in the operation of the vehicle 101, which can include a variety of examples of such actions. For example, the ADAS can determine that some item has newly appeared on the roadway (e.g., a dog has run out onto the road) and change the operation of the vehicle by operating the brakes. In another example, the ADAS can determine that a road appears wet or snowy and can cause the vehicle to cautiously reduce speed. For a further example, the ADAS can determine that an object appears in the scene even where that object would be very difficult to detect by the human eye or an SDR camera (e.g., a white truck against a bright sky) and apply a steering and/or braking correction to cause the vehicle 101 to avoid the object. In a further example, the ADAS can use the HDR camera to determine that the driveway behind the vehicle 101 appears free of obstacles, even in very low-light conditions, and can cause the vehicle to turn on its engine and back out of a garage. Other determinations and operations will be evident to one of skill in the art.

Figure 18:
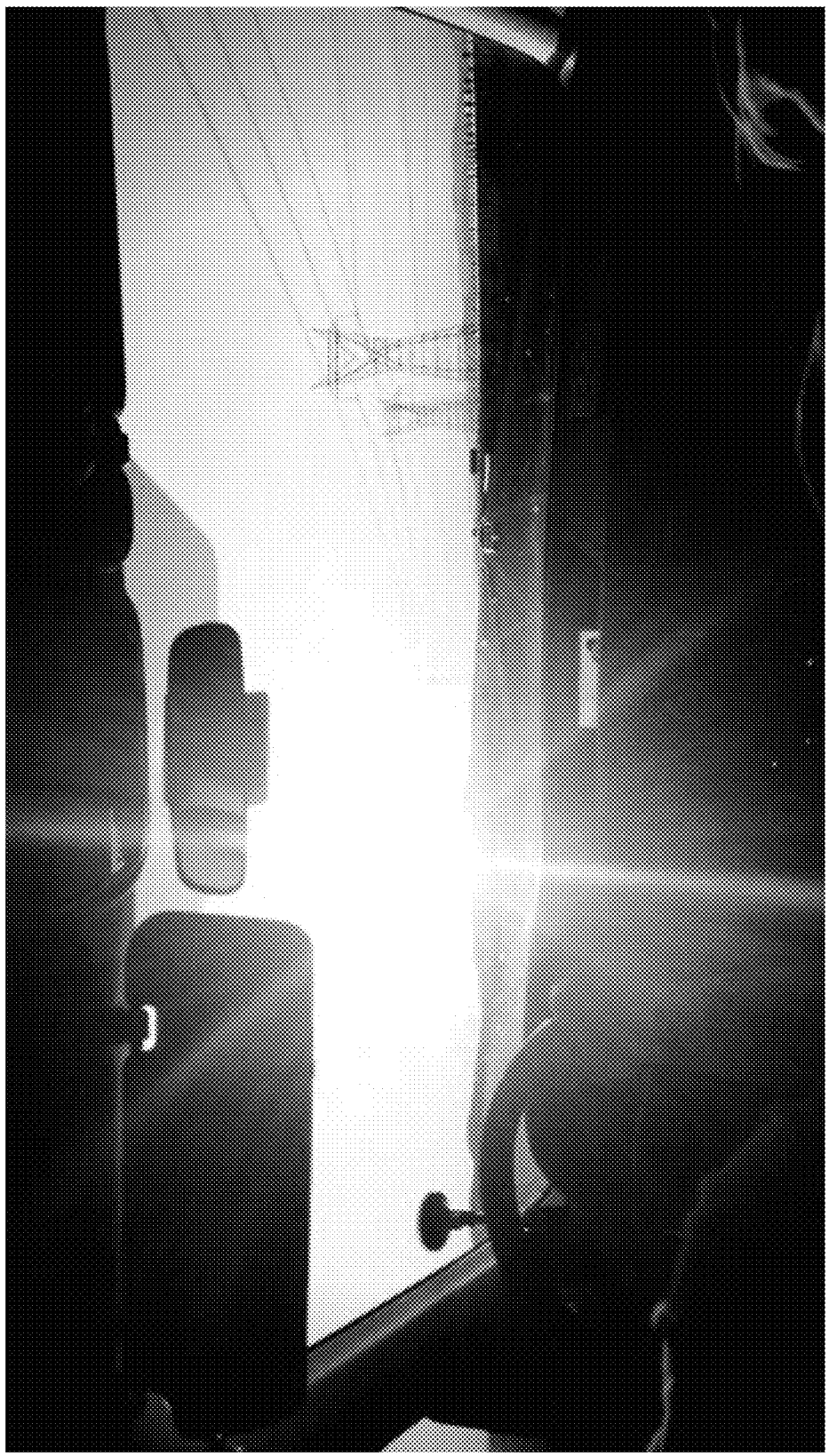
FIG. 18 depicts a scene where methods of the invention may prove beneficial.

FIG. 18 depicts a scene where the method 1701 may have beneficial applicability. In the scene, a bright sun renders it difficult for a human eye to see all of the items in front of the vehicle. However, that problem of dynamic range is addressed by the HDR camera 201. The HDR camera 201 may determine, for example, that the driver of the car in front of the vehicle 101 is has briefly tapped the brakes indicating a possible caution condition ahead. The ADAS can cause the vehicle 101 to slow down.

The HDR system may be provided as part of, or for use in, a military or emergency vehicle. The real-time HDR video camera provides the ability to detect and respond to a variety of inputs that a human would have difficulty processing, such as large numbers of inputs in a busy environment, or hard to detect inputs, such as very small things far away. As but one example, a squadron of airplanes using the HDR systems could detect and respond to each other as well as to ambient clouds, birds, topography, etc., to fly in perfect formation for long distances, e.g., and even maintain a formation while flying beneath some critical altitude over varying topography. In some embodiments, the HDR system is for a military or emergency vehicle and provides an autopilot or assist functionality. An operator can set the system to control the vehicle over a period. Additionally or alternatively, the system can be programmed to step in for an operator should the operator lose consciousness, get distracted, hit a panic button, etc. For example, the system can be connected to an eye tracker or physiological sensor such as a heart rate monitor, and can initiate a backup operation mode should such sensor detect values over a certain threshold (e.g., extremely low or elevated heart rate; exaggerated or suppressed eye movements or eye movements not directed towards an immediate path of travel). The system can be operated to place a vehicle in a holding pattern, e.g., fly in a high-altitude circle for a few hours while a pilot sleeps. It will be appreciated that a wide variety of features and functionality may be provided by the vehicle.

Figure 19:
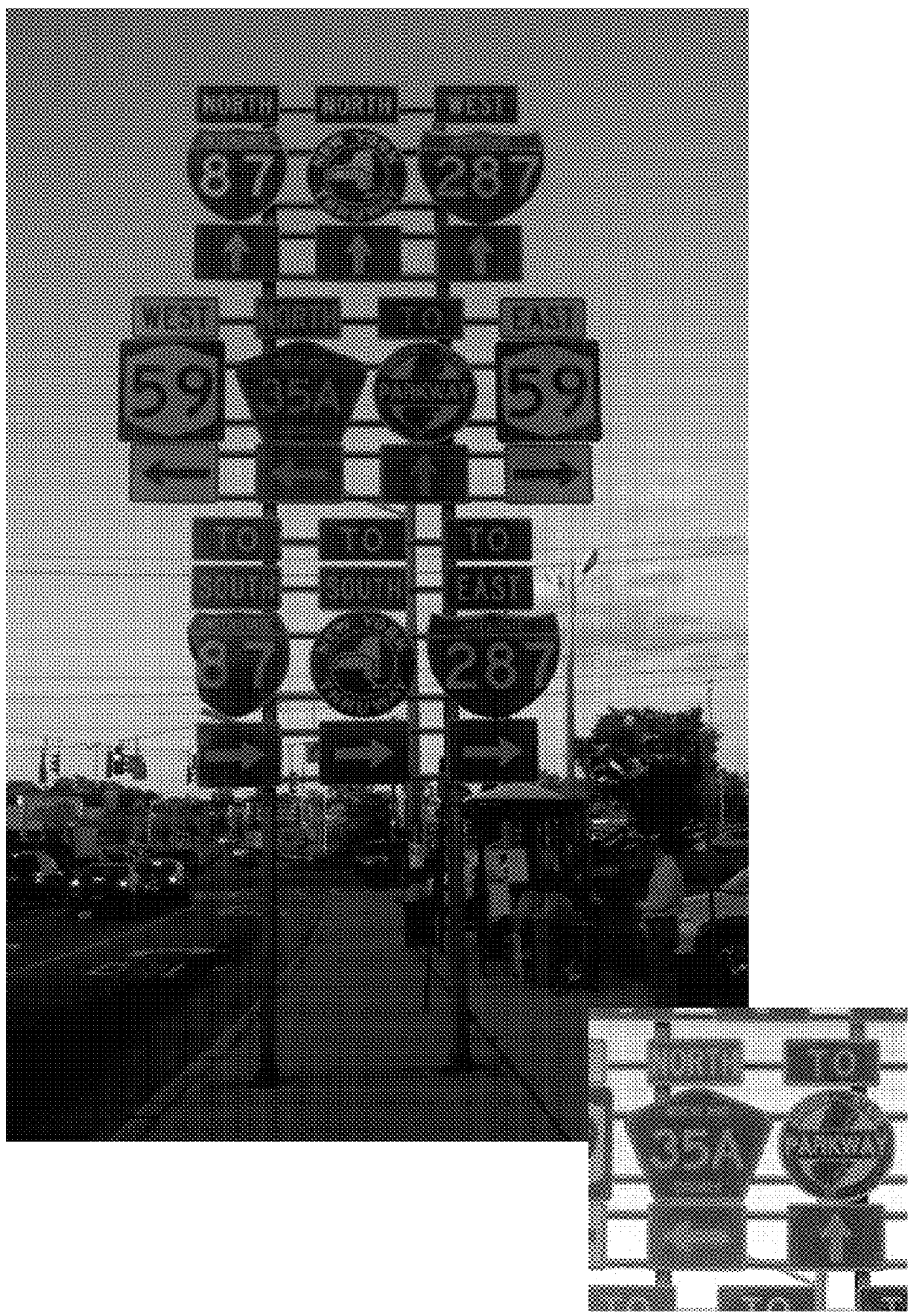
FIG. 19 illustrates another scene in which the method may be used.

FIG. 19 illustrates another scene in which the method 1701 may be used to assist in operating the vehicle. The vehicle may be operating under navigational instructions to seek the Garden State Parkway. Upon approaching the sign depicted in FIG. 19, an SDR camera may be incapable of reading the appropriate sign due to low light conditions and a human participant may be incapable of detecting the sign due to effective information overload. However, the HDR camera 201 and the processing system 113 (using OCR or pattern recognition) determines that the sign for the Garden State Parkway appears with an arrow indicating such road to lie ahead. The ADAS can use that information to cause the vehicle 101 to proceed along the road. Additionally, the HDR camera 201 may be used to detect the lane markings indicating that the number 2 lane is the closest lane that proceeds in the forward direction. Further, the HDR camera 201 may detect the illuminated brake lights of vehicles in the number 2 lane. Thus the HDR camera provides the ADAS with the information necessary to change lanes into the number 2 lane and bring the vehicle 101 to a stop to await the opportunity to proceed, to bring the vehicle 101 to the Garden State Parkway.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. An HDR system comprising:
an HDR camera comprising a first image sensor and a second image sensor coupled to a processing device, wherein the HDR camera is operable to stream pixel values from each of the first image sensor and the second image sensor in a frame-independent manner through a pipeline on the processing device, wherein the pipeline includes a kernel operation that identifies saturated pixel values and a merge module to merge the pixel values to produce a real-time HDR video whereby the system streams sequences of the pixel values through the processing device and merges the pixel values without waiting to receive pixel values from all pixels on the first image sensor or the second image sensor such that no location on the processing device stores a complete image prior to the merging; and
a processing system configured to communicate with the HDR camera and a control system of a vehicle, wherein the processing system is operable to determine, based on the HDR video, a characteristic of a feature in the vehicle's environment and to issue to the control system an instruction that directs a change in the operation of the vehicle based on the characteristic.

2. The system of claim 1, wherein the HDR camera further comprises:
a lens; and
at least one beamsplitter, wherein the first image sensor, the second image sensor, the lens, and the beamsplitter are arranged to receive and split an incoming beam of light and direct a majority of the light to a first path that impinges on the first sensor and a lesser amount of the light to a second path that impinges on the second sensor, to generate images that are optically identical but for light level.

3. The system of claim 2, wherein the HDR camera captures a 360-degree view around the vehicle.

4. The system of claim 3, wherein the captured 360-degree view is ring-shaped, and further wherein the processing system performs a de-wrapping process to convert the 360-degree view into a rectangular panoramic image.

5. The system of claim 4, further comprising detection and ranging sensors, wherein the processing system is operable to detect an object with the detection and ranging sensor, detect the object with HDR camera, and correlate an image of the object in the HDR video with a detected range of the objection determined via the detection and ranging system.

6. The system of claim 3, wherein the processing system is operable to detect glare in the environment within the 360-degree view and use the HDR camera to capture an HDR image of a portion of the environment affected by the glare.

7. The system of claim 2, wherein the processing device comprises a field-programmable gate array or an application-specific integrated circuit that includes the pipeline.

8. The system of claim 2, wherein the kernel operation operates on pixel values as they stream from each of the plurality of image sensors by examining, for a given pixel on the HE sensor, values from a neighborhood of pixels surrounding the given pixel, finding saturated values in the neighborhood of pixels, and using information from a corresponding neighborhood on the ME sensor to estimate a value for the given pixel.

9. The system of claim 8, wherein the pipeline includes—in the order in which the pixel values flow:
- a sync module to synchronize the pixel values as the pixel values stream onto the processing device from the plurality of image sensors;
- the kernel operation;
- the merge module;
- a demosaicing module; and
- a tone-mapping operator.

10. The system of claim 9, wherein the pipeline further comprises one or more of a color-correction module; an HDR conversion module; and an HDR compression module.

\* \* \* \* \*